United States Patent
Jenn et al.

(10) Patent No.: US 10,509,117 B1
(45) Date of Patent: Dec. 17, 2019

(54) CONTINUOUS WAVE (CW) RADAR SYSTEM FOR PHASE-CODED TIME DELAYED TRANSMIT-RECEIVE LEAKAGE CANCELLATION

(71) Applicant: The United States of America, as represented by the Secretary of the Navy, Arlington, VA (US)

(72) Inventors: David C. Jenn, Monterey, CA (US); Phillip E. Pace, San Juan Bautista, CA (US); Ric A. Romero, Pacific Grove, CA (US)

(73) Assignee: The United States of America, as represented by the Secretary of the Navy, Arlington, VA (US)

( * ) Notice: Subject to any disclaimer, the term of this patent is extended or adjusted under 35 U.S.C. 154(b) by 259 days.

(21) Appl. No.: 15/830,560

(22) Filed: Dec. 4, 2017

Related U.S. Application Data

(60) Provisional application No. 62/479,381, filed on Mar. 31, 2017.

(51) Int. Cl.
*G01S 13/38* (2006.01)
(52) U.S. Cl.
CPC .................. *G01S 13/38* (2013.01)
(58) Field of Classification Search
CPC ...................................................... G01S 13/38
(Continued)

(56) References Cited

U.S. PATENT DOCUMENTS

| 3,614,785 A | 10/1971 | Kratzer |
| 3,882,493 A | 5/1975 | Bolger |

(Continued)

OTHER PUBLICATIONS

Haderer et al.,"A Comparison of Phase-Coded CW Radar Modulation Schemes for Integrated Radar Sensors," Proceedings of the 11th European Radar Conference, Oct. 8-10, 2014, Rome, Italy.
(Continued)

*Primary Examiner* — Frank J McGue
(74) *Attorney, Agent, or Firm* — Naval Postgraduate School; James B. Potts; Lisa A. Norris

(57) ABSTRACT

Disclosed is a method, system, and apparatus for transmitting a randomly phase-coded CW waveform in a manner that suppresses signal leakage and enables the recovery of polyphase subcodes advantageous for the purposes of correlation and pulse compression. The CW system transmits and receives a random waveform while concurrently providing properly delayed phase conversion parameters $(\phi_i-\Theta_i)$ from a corrections generator to various range gates. Each range gate processes any echo returns using a most recent phase conversion parameters $(\phi_k-\Theta_k)$ provided and correlation of the resulting echo subcodes $\phi_R$ produce either target indications or noise signals, depending on the most recent phase conversion parameters $(\phi_k-\Theta_k)$ provided to the range gate. The system may transmit the randomly phase-coded CW waveform while recovering any phase code $\{\phi_1, \phi_2, \ldots \phi_N\}$ that lends itself to advantageous pulse compressions.

20 Claims, 10 Drawing Sheets

(58) Field of Classification Search
USPC .......................................................... 342/85
See application file for complete search history.

(56) References Cited

U.S. PATENT DOCUMENTS

| | | | |
|---|---|---|---|
| 4,078,234 A | 3/1978 | Fishbein et al. | |
| 4,359,736 A | 11/1982 | Lewis | |
| 5,861,837 A | 1/1999 | Richardson et al. | |
| 7,889,118 B1 | 2/2011 | Finley et al. | |
| 2003/0128100 A1* | 7/2003 | Burkhardt | G06K 7/0008 340/5.8 |
| 2010/0141504 A1* | 6/2010 | Szajnowski | G01S 7/35 342/85 |
| 2014/0247757 A1 | 9/2014 | Rimini et al. | |

OTHER PUBLICATIONS

Narayanan et al.,"A Multifrequency Radar System for Detecting Humans and Characterizing Human Activities for Short-Range Through-Wall and Long-Range Foliage Penetration Applications," International Journal of Microwave Science and Technology, vol. 2014, Article ID 958905 (2014).

Ranganath et al., "Effect of Pulse Shaping on Autocorrelation Function of Barker and Frank Phase Codes," Journal of Advanced Electrical and Computer Engineering, 1(1) (2014).

Zhang et al., "Investigation on adaptive leakage nulling for Pseudo-random code CW radar," 2009 IET International Radar Conference, Apr. 20-22, 2009, Guilin, China.

Axelsson,"Noise Radar Using Random Phase and Frequency Modulation," IEEE Transactions on Geoscience and Remote Sensing, 42(11) (2004).

Bharadwaj et al., "Phase Coding for Range Ambiguity Mitigation in Dual-Polarized Doppler Weather Radars," Journal of Atmospheric and Oceanic Technology, vol. 24 No. 8 (2007).

Bagley,"Radar Pulse Compression by Random Phase-Coding," The Radar and Electronic Engineer (1968).

Chapursky et al., "Signal Processing and Time Delay Resolution of Noise Radar System Based on Retrodirective Antennas," Piers Online, 5(8) (2009).

Malonowski et al.,"Target Detection in Continuous-Wave Noise Radar in the Presence of Impulsive Noise," Acta Physica Polonica A, 119(4) (2011).

Guosui et al., "The Development of Random Signal Radars," IEEE Transactions on Aerospace and Electronic Systems 35(3) (1999).

Lin et al., "Transmitter Noise Cancellation in Monostatic FMCW Radar," 2006 IEEE MTT-S International Microwave Symposium Digest (2006).

Stove, "Linear FMCW radar techniques," IEE Proceedings-F, 139(5) (1992).

Lin et al., "A Ka-Band FMCW Radar Front-End With Adaptive Leakage Cancellation," IEEE Transactions on Microwave Theory and Techniques, 54(12) (2006).

Cooper et al., "Residual Phase Noise and Transmit/Receive Isolation in a Submillimeter-Wave FMCW Radar," 2014 IEEE MTT-S International Microwave Symposium (IMS2014), (2014).

Zhang et al., "Design Considerations for a Real-Time Random-Noise Tracking Radar," IEEE Transactions on Aerospace and Electronic Systems 40(2) (2004).

\* cited by examiner

CONTINUOUS WAVE (CW) RADAR SYSTEM FOR PHASE-CODED TIME DELAYED TRANSMIT-RECEIVE LEAKAGE CANCELLATION

RELATION TO OTHER APPLICATIONS

This patent application claims the benefit of U.S. Provisional Application No. 62/479,381 filed Mar. 31, 2016, which is hereby incorporated in its entirety.

FIELD OF THE INVENTION

One or more embodiments relates generally to a randomly phase-coded continuous wave (CW) radar system.

BACKGROUND

Random signal radars are radars whose transmitting signal is typically modulated by some noise source in order to generate a random transmitting signal. Because of the random properties of the signal, these radars have multiple advantages compared with conventional radars, including unambiguous measurement of range and Doppler estimations, high immunity to noise, lower detection probabilities, and advantageous ambiguity functions, among others.

For most applications, the random signal is either transmitted directly from the noise-generating source or generated digitally, then converted to analog and upconverted to carrier level. Correlation of the echo returns uses the principle that when the delayed replica of the transmitted signal is correlated with the actual target echo, the peak value of the correlation process can indicate the distance to the target. The replica of the transmitted noise, delayed, is correlated with a received signal, and strong correlation peaks are utilized to provide round trip time (RTT) estimations and ranging. This methodology generally requires a significant amount of processing and computational resources at both the transmitting and receiving ends of the system, and challenges abound. Additionally, because correlations are conducted using the delayed replica of the random transmission as a template, any ability to utilize specific phase codes more amenable to advantageous phase compressions is generally sacrificed.

Additionally in CW systems random or otherwise, leakage from a transmitted signal generally occurs due to circuit leakages, free space propagation, near field coupling, or other propagation modes. The details depend on the specific system architecture and whether single or multiple antennas are used. For close in targets, the leakage signal strength $s_l(t)$ is generally much smaller than the signal strength returned to the radar from the target, however at longer ranges or for low radar cross section targets, the received signal from the target $s_t(t)$ is very weak. Since the receiver must operate when transmission is occurring, the leakage signal can still be much larger than the target return. In the absence of close-in clutter the leakage can be reduced by increasing the antenna spacing, but there is a practical limit to this. In the actual construction and operation of a radar system it is impossible to achieve zero leakage. Thus the isolation between the transmitting and receiving antennas (or channels) is often one of the limiting factors in the performance of CW radars.

It would be advantageous to provide a CW radar system which employs a randomly phase-coded system in order to realize the associated advantages while also providing the ability to recover specific phase codings more amenable to advantageous phase compressions. It would be additionally advantageous if the CW system eliminated some portion of the significant processing and computational resources associated with delayed replica correlation. It would provide additional advantage is such a system could transmit continuous wave signal in a manner greatly mitigating the impact of signal leakage.

These and other objects, aspects, and advantages of the present disclosure will become better understood with reference to the accompanying description and claims.

SUMMARY

A particular embodiment of the Continuous Wave (CW) Radar System comprises a random waveform generator providing a plurality of random subcodes $\Theta_i$. The random waveform generator communicates the random subcodes $\Theta_i$ to a modulator, which upconverts the random subcode $\Theta_i$ to a modulated subcode $\Theta'_i$ for subsequent transmission. The modulated subcode $\Theta'_i$ generated is an electromagnetic signal having a frequency and a phase over a subpulse width $\tau$, where the frequency is typically fixed and the phase is dependent on the most recent random subcode $\Theta_i$ received. The modulator communicates the modulated subcode $\Theta'_i$ to a transmitting antenna as well as to a corrections generator.

In conjunction, a polyphase subcode generator produces a polyphase subcode $\phi_i$ corresponding to each random subcode $\Theta_i$. The polyphase subcode $\phi_i$ is a member of a set of polyphase subcodes having at least N number of members. For example, the polyphase subcode $\phi_i$ may be a member of a set defining one of the code sequences known as Barker, Frank, Chu, Milewski, and others, however this is not required, and the polyphase subcode $\phi_i$ may be a member of any set defining any phase-coding scheme. The polyphase subcode generator additionally communicates the polyphase subcode $\phi_i$ to the corrections generator. The corrections generator is further in data communication with a plurality of range gates $RG_j$, where j is used to denote a counting integer greater than or equal to 1 and less than some maximum integer m. Each range gate $RG_j$ provides range binning for a range interval of the CW system.

Generally for each subpulse width $\tau$, the corrections generator generates a phase conversion parameter $(\phi_i-\Theta_i)$ using the subcode $\Theta_i$ and the corresponding polyphase subcode $\phi_i$ received. The corrections generator subsequently provides the phase conversion parameter $(\phi_i-\Theta_i)$ generated for the random subcode $\Theta_i$ to each individual range gate $RG_j$ using a delay $D_j$ specific and unique to that particular range gate. In a typical embodiment, each individual range gate $RG_j$ has an associated delay generally dependent on a time equal to $(\tau \times j)+\Delta T_{P(j)}$, where j corresponds to the indexing integer of the range gate, $(\tau \times j)$ indicates the subpulse width $\tau$ multiplied by the indexing integer of the range gate $RG_j$, and $\Delta T_{(j)}$ is a processing time required by receiving components in the system. Under this arrangement, each range gate $RG_j$ generally receives a new phase conversion parameter $(\phi_i-\Theta_i)$ corresponding to each subpulse width $\tau$ of the modulated subcode $\Theta'_i$ transmitted. However, because of the delay D of $(\tau \times j)+\Delta T_{P(j)}$ applicable to each range gate $RG_j$, the phase conversion parameter most recently received at a given range gate from corrections generator varies among the range gates. As a result, each range gate $RG_j$ has a most recent phase conversion parameter $(\phi_k-\Theta_k)$ received from the corrections generator.

The CW system receives and processes echoes by receiving a modulated echo $\Theta'_R$ and demodulating the echo to generate a demodulated subcode $\Theta_R$. The demodulated subcode $\Theta_R$ is provided to each range gate $RG_j$, which converts the phase of the demodulated subcode $\Theta_R$ using its most recent phase conversion parameter $(\phi_k-\Theta_k)$. The range gate $RG_j$ adds the resulting echo subcode $\phi_R$ to a string of subcodes and then correlates the updated polyphase sequence against the set of N polyphase subcodes utilized by the polyphase subcode generator. As a result of the associated time delays generating different $(\phi_k-\Theta_k)$ parameters to each range gate, and the random nature of the modulated subcode $\Theta'_i$ being transmitted, and the demodulated subcode $\Theta_R$ being supplied, the resulting phase conversion and correlation at each range gate substantially generates either a compressed $\{\phi_1, \phi_2, \ldots \phi_N\}$ pulse when the echo originates within the range interval corresponding to the range gate $RG_j$, or substantially generates a noise signal otherwise. Subsequent integration is typically utilized to identify the range interval from which a given modulated echo $\Theta'_R$ originated.

The novel apparatus and principles of operation are further discussed in the following description.

Embodiments in accordance with the invention are further described herein with reference to the drawings.

DETAILED DESCRIPTION OF THE INVENTION

The following description is provided to enable any person skilled in the art to use the invention and sets forth the best mode contemplated by the inventor for carrying out the invention. Various modifications, however, will remain readily apparent to those skilled in the art, since the principles of the present invention are defined herein specifically to provide a method, system, and apparatus for transmission of a random phase-coded waveform while providing for recovery of an underlying phase code.

Provided here is a method, system, and apparatus for transmitting a randomly phase-coded CW waveform in a manner enabling the recovery of polyphase subcodes advantageous for the purposes of correlation and pulse compression. The CW system disclosed transmits and receives a random phase-coded waveform while concurrently providing properly delayed phase conversion parameters $(\phi_i-\Theta_i)$ from a corrections generator to each of a plurality of range gates $RG_j$. Each range gate identifies and processes any echo returns using a most recent phase conversion parameters $(\phi_k-\Theta_k)$ provided from the corrections generator, and correlation of the resulting echo subcodes $\phi_R$ produce either target indications or noise signals, depending on the most recent phase conversion parameters $(\phi_k-\Theta_k)$ provided to the range gate. The method, system, and apparatus provided differs substantially from that employed by typical random radars transmitting randomly phase coded CW waveforms, which typically rely on recording and updating a series of echo subcodes received for subsequent comparison against a delayed replica, in order to determine round trip time (RTT) and provide ranging functionality. Additionally, in typical random radars, the random transmitted waveform is typically correlated against the (also random) delayed replica, and any ability to utilize specifically advantageous phase codes is lost. In contrast, the system, method, and apparatus disclosed here provides for transmission of a random CW waveform while also allowing the use of any phase code $\{\phi_1, \phi_2, \ldots \phi_N\}$ that lends itself to advantageous pulse compressions.

Figure 1:
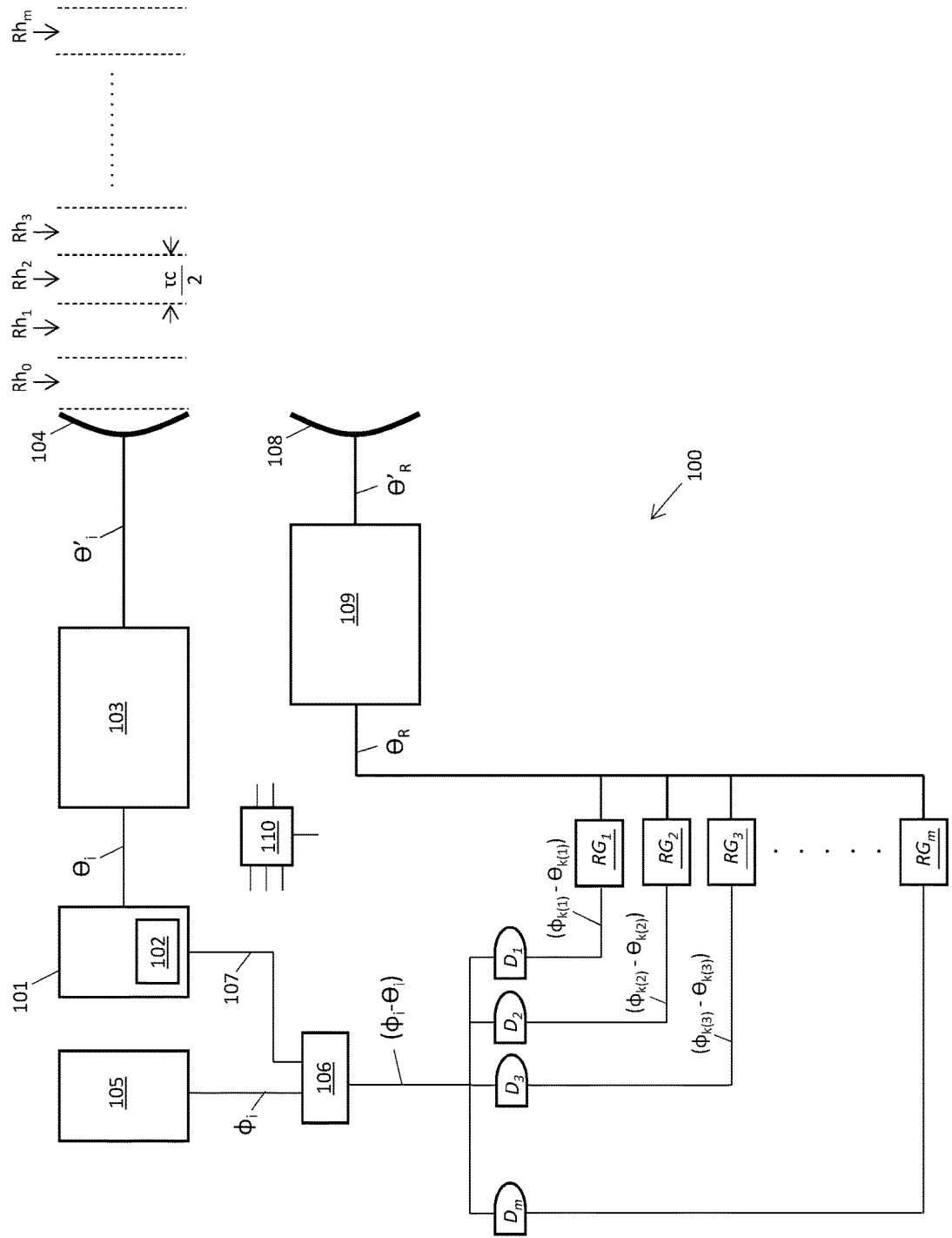
FIG. 1 illustrates an embodiment of the CW system.

A particular embodiment of the Continuous Wave (CW) Radar System disclosed is illustrated at FIG. 1. At FIG. 1, CW System 100 comprises random waveform generator 101 typically comprising a noise source 102. Random waveform generator 101 generates a random phase coded waveform based on noise source 102, where the random phase coded waveform comprises a plurality of random subcodes $\Theta_i$ with each random subcode $\Theta_i$ corresponding to a subpulse width $\tau$, where $\tau$ is a measure of time. The random waveform generator 101 communicates the random subcode $\Theta_i$ to a modulator 103 which receives each random subcode $\Theta_i$ and upconverts the random subcode $\Theta_i$ to a modulated subcode $\Theta'_i$. In some embodiments modulator 103 comprises a digital processor and provides a digital-to-analog conversion of the random subcode $\Theta_i$ in order to upconvert to the modulated subcode $\Theta'_i$. Such digital modulation methods are known in the art. The modulated subcode $\Theta'_i$ generated is an electromagnetic signal having a frequency and a phase over the subpulse width $\tau$, where the frequency is typically fixed and the phase is dependent on the random subcode $\Theta_i$ corresponding to a subpulse width $\tau$. In particular embodiments, this is the most recent random subcode $\Theta_i$ received by Modulator 103. The modulator communicates the modulated subcode $\Theta'_i$ to a transmitting antenna 104, which transmits the modulated subcode $\Theta'_i$ at a time $t_i$ for a period of time equivalent to the subpulse width $\tau$. Random waveform generator 101 additionally communicates each random subcode $\Theta_i$ to corrections generator 106 via, for example, 107.

In conjunction, a polyphase subcode generator 105 produces a polyphase subcode corresponding to each random subcode $\Theta_i$. The polyphase subcode $\phi_i$ is a member of a set of polyphase subcodes having N number of members. For example, the polyphase subcode $\phi_i$ may be a member of a set defining one of the code sequences known as Barker, Frank, Chu, Milewski, and others, however this is not required. Within this disclosure, the polyphase subcode $\phi_i$ may be a member of any set defining any phase-coding scheme. Polyphase subcode generator 105 additionally communicates the polyphase subcode $\phi_i$ to corrections generator 106, as illustrated.

Corrections generator 106 is in data communication with a plurality of range gates $RG_j$, where j is used to denote a counting integer greater than or equal to 1 and less than some maximum integer m, where m>1. For example at FIG. 1, the plurality of range gates $RG_j$ comprises $RG_1$, $RG_2$, $RG_3$, and so on to the range gate indicated as $RG_m$. Each range gate $RG_j$ generally corresponds to a range bin dependent on the subpulse width $\tau$ utilized, as is typical for CW radars. For example at FIG. 1, range gate $RG_1$ provides binning for the range interval generally indicated by $RH_1$, range gate $RG_2$ provides binning for the range interval generally indicated by $RH_2$, range gate $RG_3$ provides binning for the range interval generally indicated by $RH_3$, and range gate $RG_m$ provides binning for the range interval generally indicated by $RH_m$. In typical embodiments, each range interval generally covers a physical displacement equal to about $\tau s/2$, where c is the speed of light. As indicated at FIG. 1 and as will be discussed later, in typical embodiments there is no $RG_j$ range gate intended to provide binning for the range interval $RH_0$ in order to enhance leakage suppression.

As discussed, for each subpulse width $\tau$ associated with a random subcode $\Theta_i$, corrections generator 106 receives both the random subcode $\Theta_i$ generated by random waveform generator 101 and the polyphase subcode $\phi_i$ generated by polyphase subcode generator 105. Corrections generator 106 then generates a phase conversion parameter $(\phi_i-\Theta_i)$ using the subcode $\Theta_i$ and the corresponding polyphase subcode $\phi_i$. Corrections generator 106 subsequently provides the phase conversion parameter $(\phi_i-\Theta_i)$ generated for the random subcode $\Theta_i$ and corresponding polyphase subcode $\phi_i$ to each individual range gate $RG_j$ using a delay $D_j$ specific and unique to that particular range gate, where the delay $D_j$ follows the time t, when transmitting antenna 104 transmits the modulated subcode $\Theta'_i$ derived from the random subcode $\Theta_i$. These delays are represented at FIG. 1 by the series of delays illustrated as $D_1$, $D_2$, $D_3$, and $D_m$. In a typical embodiment the individual delays $D_j$ are representative of time periods defined generally by $(\tau \times j)+\Delta T_{P(j)}$, where $\tau$ is the subpulse width $\tau$ and $\Delta T_{P(j)}$ is typically a time period required in order to receive and process an echo to a form suitable for delivery to the plurality of range gates $RG_j$, as will be discussed. The $\Delta T_{P(j)}$ may be a period specific and known by CW system 100 for each range gate $RG_j$ based on timing diagnostics or other testing, or in some embodiments may be a period common to all range gates $RG_j$ in the plurality. However, the individual delays $D_j$ need not adhere or strictly depend on the exemplary $(\tau \times j)+\Delta T_{P(j)}$ expression, provided the individual delays $D_j$ are specific and unique to a range gate $RH_j$. In some embodiments, a timing circuit 110 is in communication with at least random waveform generator 101, polyphase subcode generator 105, and corrections generator 106, in order to provide timing signals for appropriate random subcode $\Theta_i$ and polyphase subcode $\phi_i$ delivery, association for generating the phase conversion parameter $(\phi_i-\Theta_i)$, and to provide timing or other signals by which a given phase conversion parameter $(\phi_i-\Theta_i)$ is provided to a given range gate $RG_j$ based on an appropriate delay $D_j$, among other synchronizations that may be necessary.

The phase conversion parameter $(\phi_i-\Theta_i)$ is generated by corrections generator 106 using an operation such as a digital process, an analog process, or some combination therein. The phase conversion parameter $(\phi_i-\Theta_i)$ generated by the digital process, the analog process, or the combination can be used in conjunction with a given random subcode $\Theta_i$ to substantially produce the polyphase subcode $\phi_i$ produced by polyphase generator 105 which corresponds to the given random subcode $\Theta_i$. As previously mentioned, polyphase subcode generator 105 produces a polyphase subcode $\phi_i$ corresponding to each random subcode $\Theta_i$ generated by random waveform generator 101 for each subpulse width $\tau$, and corrections generator 106 then generates a phase conversion parameter $(\phi_i-\Theta_i)$ using the subcode $\Theta_i$ and the corresponding polyphase subcode $\phi_i$, such that for a specific random subcode $\Theta_{i(S)}$ and a corresponding specific polyphase subcode $\phi_{i(S)}$, corrections generator 106 generates a specific phase conversion parameter $(\phi_{i(S)}-\Theta_{i(S)})$. Given the random nature of the random subcodes $\Theta_i$ generated by random waveform generator 101, in order to substantially produce the specific polyphase subcode $\phi_{i(S)}$ corresponding to the specific random subcode $\Theta_{i(S)}$ using a phase conversion parameter, both the specific phase conversion parameter $(\phi_{i(S)}-\Theta_{i(S)})$ generated for the specific random subcode $\Theta_{i(S)}$ and an approximate version or replica of the specific random subcode $\Theta_{i(S)}$ must be present, as discussed further below.

Under this arrangement, each range gate $RG_j$ generally receives a new phase conversion parameter $(\phi_i-\Theta_i)$ corresponding to each subpulse width $\tau$ of the modulated subcode $\Theta'_i$ transmitted by transmitting antenna 104. However, because of the delay D of, for example, $(\tau \times j)+\Delta T_{P(j)}$ applicable to each range gate $RG_j$, the phase conversion parameter most recently received at a given range gate from corrections generator 106 varies among the range gates. As a result, each range gate $RG_j$ has a most recent phase conversion parameter $(\phi_k-\Theta_k)$ received from corrections generator 106, where the $(\phi_k-\Theta_k)$ received is a properly delayed phase conversion parameter $(\phi_i-\Theta_i)$, and where generally at any given instant, the most recent phase conversion parameter $(\phi_k-\Theta_k)$ for a specific range gate $RG_j$ is unique to the specific range gate $RG_j$ in the plurality of range gates $RG_j$. For example at FIG. 1, the most recent phase conversion parameter $(\phi_k-\Theta_k)$ for $RG_1$ is $(\phi_{k(1)}-\Theta_{k(1)})$, the most recent phase conversion parameter $(\phi_k-\Theta_k)$ for $RG_2$ is $(\phi_{k(2)}-\Theta_{k(2)})$, and the most recent phase conversion parameter $(\phi_k-\Theta_k)$ for $RG_3$ is $(\phi_{k(3)}-\Theta_{k(3)})$, with typically $(\phi_{k(1)}-\Theta_{k(1)})$, $(\phi_{k(2)}-\Theta_{k(2)})$, and $(\phi_{k(3)}-\Theta_{k(3)})$ representing non-equivalent signals due at least to the random nature of the random subcodes $\Theta_{k(1)}$, $\Theta_{k(2)}$, and $\Theta_{k(3)}$ on which the respective most recent phase parameters are based, as well as the respective polyphase subcodes $\phi_{k(1)}$, $\phi_{k(2)}$, and $\phi_{k(3)}$ which typically vary from a first subpulse width $\tau$ to a subsequent subpulse width $\tau$.

CW system 100 performs the steps described on a cyclic basis, in order to transmit a continuous wave random radar signal comprising a plurality of modulated subcodes $\Theta'_i$ and, for each modulated subcode $\Theta'_i$, provide phase conversion parameters $(\phi_i-\Theta_i)$ to each range gate $RG_j$, where the phase conversion parameter $(\phi_i-\Theta_i)$ comprises a polyphase subcode $\phi_i$ corresponding to one of the transmitted modulated subcodes $\Theta'_i$, and where the polyphase subcode $\phi_i$ is a member of a set of polyphase subcodes having at least N number of members. Each of the range gates $RG_j$, utilizes the phase conversion parameters $(\phi_i-\Theta_i)$ received in order to process a received echo, as discussed below.

CW system 100 receives and processes echoes by receiving a modulated echo $\Theta'_R$ through antenna 108 and communicating the modulated echo $\Theta'_R$ to demodulator 109, which demodulates the echo, generates a demodulated subcode $\Theta_R$, and provides the demodulated subcode $\Theta_R$ to each range gate $RG_j$ over the processing time $\Delta T_{P(j)}$. The processing period $\Delta T_{P(j)}$ is generally the period from receipt of an echo at a receiving antenna such as antenna 108 through supply of the demodulated subcode $\Theta_R$ to a specific range gates $RG_j$, and as discussed may be a time period common to all range gates $RG_j$. In certain embodiments, the $\Delta T_{P(j)}$ is used to determine a delay $D_j$ of $(\tau \times j)+\Delta T_{P(j)}$ observed by corrections generator 106. For a given CW system 100, the processing periods $\Delta T_{P(j)}$ with respect to a given demodulator 109 and a given range gate $RG_j$ may be determined for a given collection of hardware components. In typical embodiments, timing circuit 110 is further in communication with demodulator 109 to provide timing signals for coordination among at least random waveform generator 101, polyphase subcode generator 105, and corrections generator 106. In particular embodiments demodulator 109 comprises a digital processor and provides an analog-to-digital conversion of the modulated echo $\Theta'_R$ in order to demodulate the echo to the demodulated subcode $\Theta_R$. Such digital demodulation methods are known in the art.

Having received the demodulated subcode $\Theta_R$ from demodulator 109, each range gate $RG_j$ converts the phase of the demodulated subcode $\Theta_R$ using its most recent phase conversion parameter $(\phi_k-\Theta_k)$ received from corrections generator 106 and generates an echo subcode $\phi_R$. The range gate $RG_j$ adds the resulting echo subcode $\phi_R$ to a string of subcodes comprising echo subcodes previously received to generate an updated polyphase sequence, and then correlates the updated polyphase sequence using a matched filter, where in an embodiment the matched filter utilizes a reference register comprising the set of N polyphase subcodes utilized by polyphase subcode generator 106. As a result of the associated time delays generating different $(\phi_k-\Theta_k)$ parameters to each range gate, and the random nature of the modulated subcode $\Theta'_i$ being transmitted and the demodulated subcode $\Theta_R$ being supplied, as a given range gate phase rotates or converts the demodulated subcode $\Theta_R$ for a given subpulse width $\tau$ to generate the updated polyphase sequence, the correlation of the updated polyphase sequence will generate a compressed $\{\phi_1, \phi_2, \ldots \phi_N\}$ pulse only when the delayed $(\phi_k-\Theta_k)$ parameter matches an echo originating within the range interval corresponding to the range gate $RG_j$, and substantially generate a noise signal otherwise. Subsequent integration of the output of each matched filter within the plurality of range gates $RG_j$ is subsequently utilized to identify the range interval from which a given modulated echo $\Theta'_R$ originated.

This methodology differs substantially from that employed by typical random radars transmitting randomly phase coded CW waveforms. In a typical random radar, following receipt of an echo analogous to modulated echo $\Theta'_R$, the random radar records and updates a series of echo subcodes received, then compares the resulting string of subcodes to a delayed replica of previously transmitted subcodes in order to determine a round trip time (RTT), based on when the delayed replica was originally transmitted. The correct range gate is then generally activated based on the RTT resulting from this direct comparison of the received and replicated strings of subcodes. Further, any pulse compression which is performed is conducted using a matched filter having some version of the delayed replica as a template. Because the transmitted waveform is necessarily random and the delayed replica is subsequently also random, this eliminates any ability to generate phase codes which may be more amenable to phase compression, such as the aforementioned Barker, Frank, Chu, Milewski, and other phase code schemes. In contrast, CW system 100 of FIG. 1 transmits and receives a random waveform while avoiding the necessary use of a delayed replica for RTT determination, by providing properly delayed phase conversion parameters $(\phi_i-\Theta_i)$ from corrections generator 106 to the various range gates $RG_j$. In addition to avoiding the additional processing associated with the necessary storing and subsequent comparison against a delayed replica as performed in current random radars, the methodology of CW system 100 also has the significant advantage of enabling recovery of the underlying phase code $\{\phi_1, \phi_2, \ldots \phi_N\}$ associated with a given $\{\Theta_1, \Theta_2, \ldots \Theta_N\}$ series of modulated subcodes $\Theta'_i$ transmitted, based on the phase conversion parameters $(\phi_i-\Theta_i)$ appropriately delayed and provided by corrections generator 106. This allows use of any phase code $\{\phi_1, \phi_2, \ldots \phi_N\}$ that lends itself to advantageous pulse compressions while concurrently transmitting a randomly phase-coded CW waveform.

Figure 2:
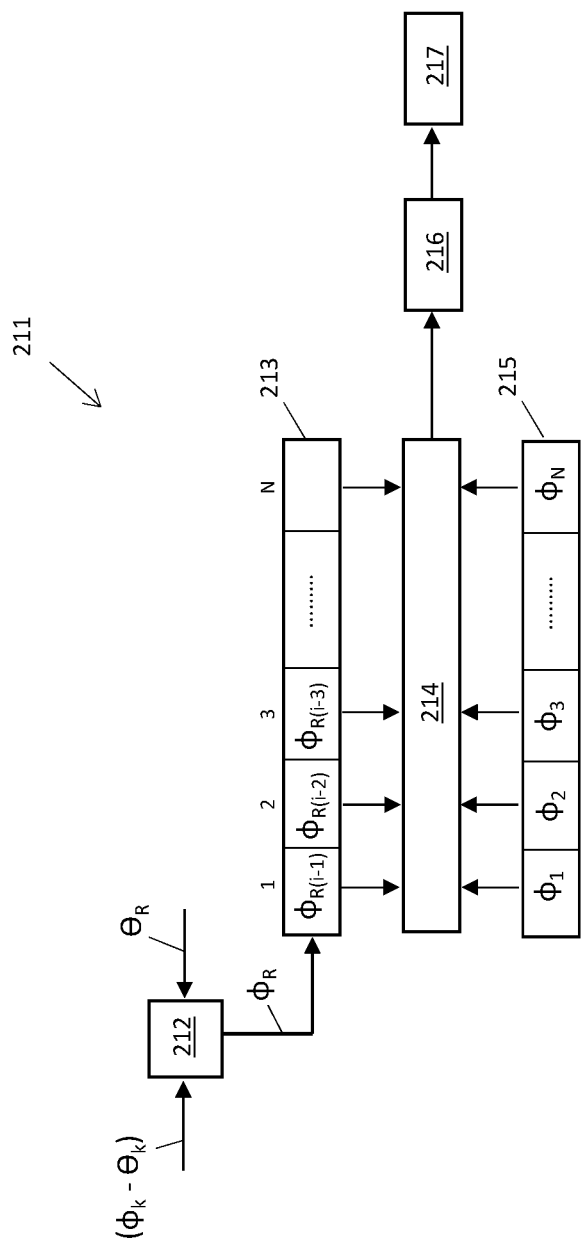
FIG. 2 illustrates a specific embodiment of a range gate.

The operation of CW system 100 is further discussed with reference to FIG. 2. FIG. 2 illustrates an embodiment of one of the plurality of range gates $RG_j$ as range gate 211. Range gate 211 comprises a phase conversion module 212 receiving a most recent phase conversion parameter $(\phi_k-\Theta_k)$ from corrections generator 106 and a demodulated subcode $\Theta_R$ from demodulator 109. Phase conversion module 212 converts the phase of the demodulated subcode $\Theta_R$ using the most recent phase conversion parameter $(\phi_k-\Theta_k)$ and generates echo subcode $\phi_R$. Range gate 211 adds the resulting echo subcode $\phi_R$ to a string of subcodes $\{\phi_{R(i-1)}, \phi_{R(i-2)}, \phi_{R(i-3)} \ldots\}$ previously received and held in, for example, shift register 213. At each receipt of new echo subcode $\phi_R$, range gate 211 correlates the string of subcodes using matched filter 214 having a reference register 215, with reference register 215 comprising the advantageous set of N polyphase subcodes $\{\phi_1, \phi_2, \phi_3, \ldots \phi_N\}$ utilized by polyphase subcode generator 105. Due to the $2\tau(j)+\Delta T_{P(j)}$ delay of the most recent phase conversion parameter $(\phi_k-\Theta_k)$ among the range gates $RG_j$, the phase conversion operation will provide a string of subcodes $\{\phi_{R(i-1)}, \phi_{R(i-2)}, \phi_{R(i-3)} \ldots\}$ closely mirroring the N polyphase subcodes $\{\phi_1, \phi_2, \phi_3, \ldots \phi_N\}$ only if range gate 211 corresponds to the range interval where a modulated echo $\Theta'_R$ originated, and provide substantially noise otherwise. As a result, when range gate 211 corresponds to the range interval where the modulated echo $\Theta'_R$ originated, matched filter 214 provides the advantageous pulse compression enabled by the N polyphase subcodes $\{\phi_1, \phi_2, \phi_3, \ldots \phi_N\}$, and generally produces a noisy output otherwise. The compression of matched filter 214 is subsequently provided to integrator 216 and output 217. The phase conversion module 212 may generate an specific echo subcode $\phi_{R(S)}$ from a specific demodulated subcode $\Theta_{R(S)}$ and a specific most recent phase conversion parameter $(\phi_k-\Theta_k)_{(S)}$ using an operation such as a digital process, an analog process, or some combination therein.

It is understood that although the N polyphase subcodes $\{\phi_1, \phi_2, \phi_3, \ldots \phi_N\}$ utilized for correlation as described above may comprise a set of N repeating polyphase subcodes, this is not required. In some embodiments, polyphase subcode generator 105 utilizes a non-repeating set of polyphase subcodes and corrections generator 106 acts to additionally provide each subcode $\phi_i$ comprising a phase conversion parameter $(\phi_i-\Theta_i)$ to each range gate with a delay similar to that utilized for the phase conversion parameter $(\phi_i-\Theta_i)$, in order that the range gate may update its matched filter template in a manner similar to updating the string of subcodes $\{\phi_{R(i-1)}, \phi_{R(i-2)}, \phi_{R(i-3)} \ldots\}$. However in certain embodiments, polyphase subcode generator 105 utilizes a set of N polyphase subcodes in a repeating sequential order, and in other embodiments, a matched filter comprising a range gate comprises a reference register, and the reference register comprises each of the polyphase subcodes arrayed in the sequential order.

It is additionally understood that the delays D such as $D_1, D_2, D_3, \ldots, D_m$ formulated as, for example, as $(\tau \times j)+\Delta T_{P(j)}$ may be explicit measures of time, or alternatively may be determined based on some database or other index b, where b is generated and updated based on each generation of a random subcode $\Theta_i$ generally having the subpulse width $\tau$, or based on transmission of a modulated subcode $\Theta'_i$ generally having the subpulse width $\tau$, or both. For example, when timing circuit 110 provides clocking signals to random waveform generator 101 and polyphase subcode generator 105 for the coordinated generation of the random subcode $\Theta_i$, the polyphase subcode $\phi_i$, and supply of the respective subcodes to corrections generator 106, corrections generator 106 may generate a phase conversion parameter $(\phi_i-\Theta_i)_b$ for storage in a database indexed by b. Similarly, in a synchronized operation, the time t, corresponding to transmission of a given modulated subcode $\Theta'_i$ may be associated with the index b. As a result, based on the clocking signals and the synchronization of timing circuit 110, index b itself may be utilized as a counter for the appropriate passage of time. In certain embodiments, CW system 100 may operate by providing phase conversion parameters to each range gate $RG_j$ based on signals provided by timing circuit 110 and provide a phase conversion parameter $(\phi_i-\Theta_i)_{(b-j)}$ to each range gate $RG_j$. For example, when the operations of CW system 100 are synchronized based on signals from timing circuit 110 and an index (b-0) is associated with a transmission time at a time $t_i$, the timing circuit 110 may provide a signal directing corrections generator 106 to provide a phase conversion parameter $(\phi_i-\Theta_i)_{(b-1)}$ to $RG_1$, a phase conversion parameter $(\phi_i-\Theta_i)_{(b-2)}$ to $RG_2$, and phase conversion parameter $(\phi_i-\Theta_i)_{(b-m)}$ to a range gate $RG_m$. CW system 100 may use any appropriate indexing scheme in order to track the provision of phase conversion parameters to specific range gates following appropriate delays.

Figure 3:
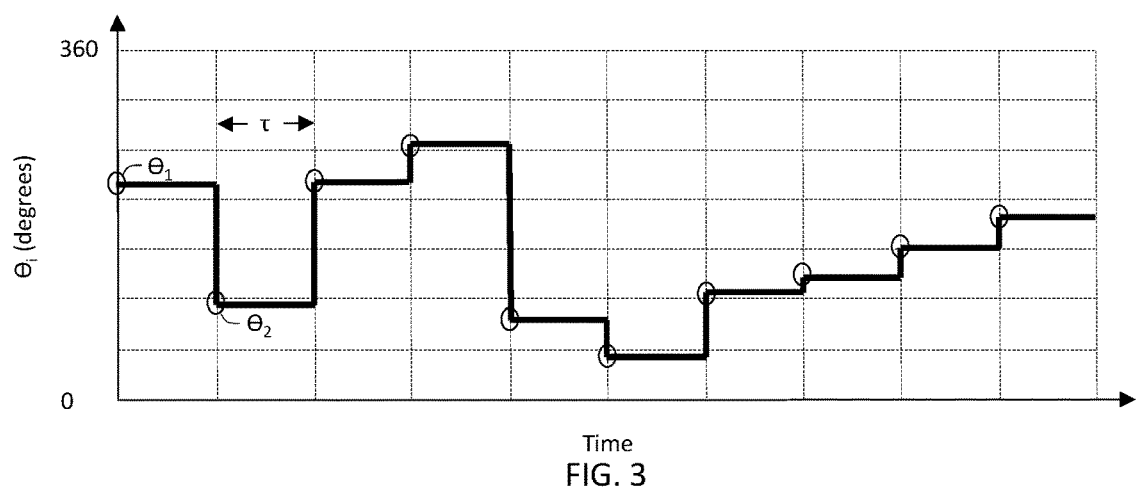
FIG. 3 illustrates a plurality of random phase subcodes.

An exemplary illustration of the random subcodes $\Theta_i$ which might be generated by random waveform generator 101 is shown at FIG. 3, which depicts a plurality of subcodes $\Theta_i$ extending over a time period with the time period divided into substantially equal subpulse widths $\tau$. At FIG. 3, the plurality of random subcodes $\Theta_i$ defines a phase value between 0 and 360 degrees. Random waveform generator 101 provides a random subcode $\Theta_i$ between 0 and 360 at each $\tau$, such as the random subcode $\Theta_1$ at a first $\tau$, the random subcode $\Theta_2$ at a second $\tau$, and so on. The phase values generated across the time period depicted are generally indicated by circles. Random waveform generator 101 communicates the random subcodes $\Theta_i$ to modulator 103 and further to corrections generator 106, as discussed.

Figure 4:
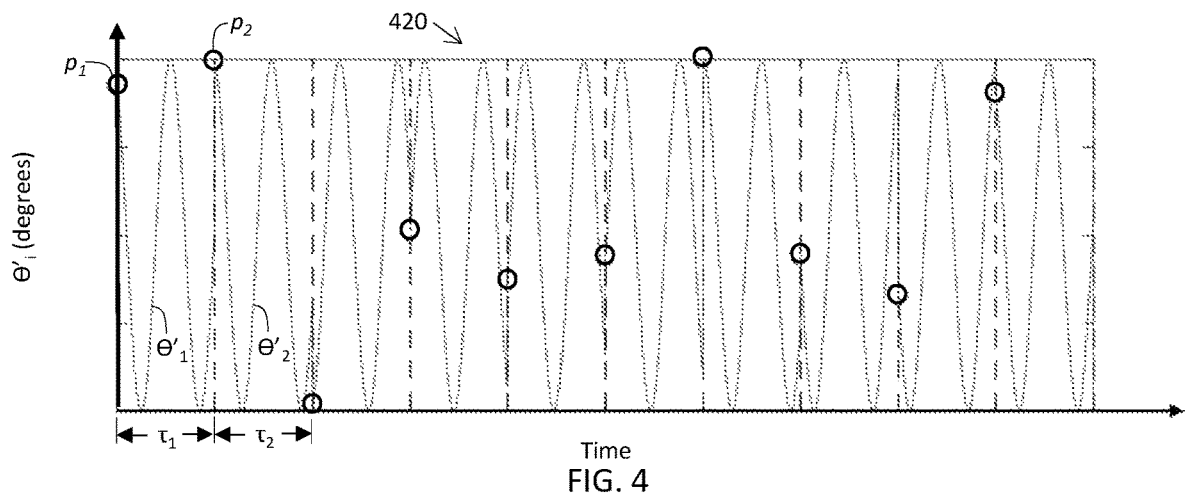
FIG. 4 illustrates a modulated randomly phase-coded waveform.

Modulator 103 receives the random subcodes $\Theta_i$ and upconverts each random subcode $\Theta_i$ to a modulated subcode $\Theta'_i$. A plurality of modulated subcodes $\Theta'_i$ generated by modulator 103 in response to a plurality of subcodes $\Theta_i$ provided by random waveform generator 101 is illustrated at FIG. 4 as the phase-coded waveform generally indicated by 420. The modulated subcodes $\Theta'_i$ comprising phase-coded waveform 420 extend over a time period divided into substantially equal subpulse widths $\tau$ and are phase shifted relative to each other, with the respective phases of each modulated subcode $\Theta'_i$ based on the corresponding random subcode $\Theta_i$. For example at FIG. 4, the modulated subcode $\Theta'_i$ extends over $\tau_1$ with a phase angle at the commencement of $\tau_1$ of $p_1$, while the modulated subcode $\Theta'_1$ extends over $\tau_2$ with a phase angle at the commencement of $\tau_2$ of $p_2$. Additional phase angles utilized across the time period depicted are generally indicated by circles. As previously discussed, each modulated subcode $\Theta'_i$ is an electromagnetic signal having a frequency and a phase over a subpulse width $\tau$, where the frequency is typically fixed and the phase is dependent on the most recent random subcode $\Theta_i$ received. Modulator 103 communicates the plurality of modulated subcodes $\Theta'_i$ comprising phase-coded waveform 420 to transmitting antenna 104, which transmits phase-coded waveform 420.

Figure 5:
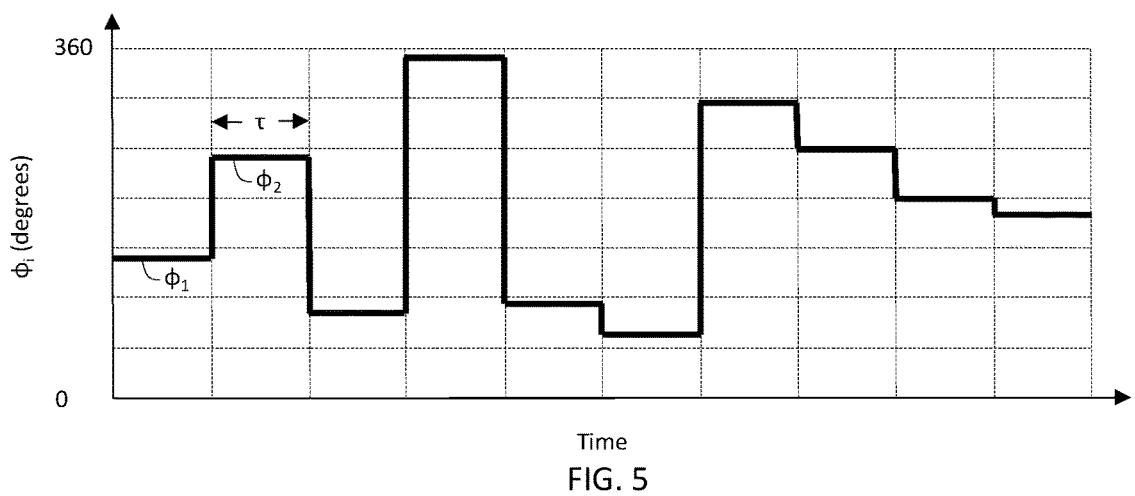
FIG. 5 illustrates a plurality of polyphase subcodes.

Further as previously discussed, polyphase subcode generator 105 produces a polyphase subcode $\phi_i$ corresponding to each random subcode $\Theta_i$. A plurality of polyphase subcodes $\phi_i$ generated by polyphase subcode generator 105 and corresponding to individual random subcodes $\Theta_i$ comprising a plurality of random subcodes $\Theta_i$ is illustrated at FIG. 5. At FIG. 5, the plurality of polyphase subcodes $\phi_i$ extends over a time period with the time period divided into substantially equal subpulse widths $\tau$, and define a phase value between 0 and 360 degrees. Polyphase subcode generator 105 provides a polyphase subcode $\phi_i$ between 0 and 360 at each $\tau$, such as the polyphase subcode $\phi_1$ at a first $\tau$, the polyphase subcode $\phi_2$ at a second $\tau$, and so on. Each polyphase subcode $\phi_i$ is a member of a set of polyphase subcodes having at least N number of members, where N may be any quantity and typically defines some phase-coding scheme. Polyphase subcode generator 105 communicates the polyphase subcodes $\phi_i$ to corrections generator 106, as discussed.

Corrections generator 106 receives each random subcode $\Theta_i$ such as those illustrated at FIG. 3 and a corresponding polyphase subcode $\phi_i$ such as those illustrated at FIG. 5, and generates a phase conversion parameter $(\phi_i-\Theta_i)$ using the subcode $\Theta_i$ and the corresponding polyphase subcode $\phi_i$.

Figure 6:
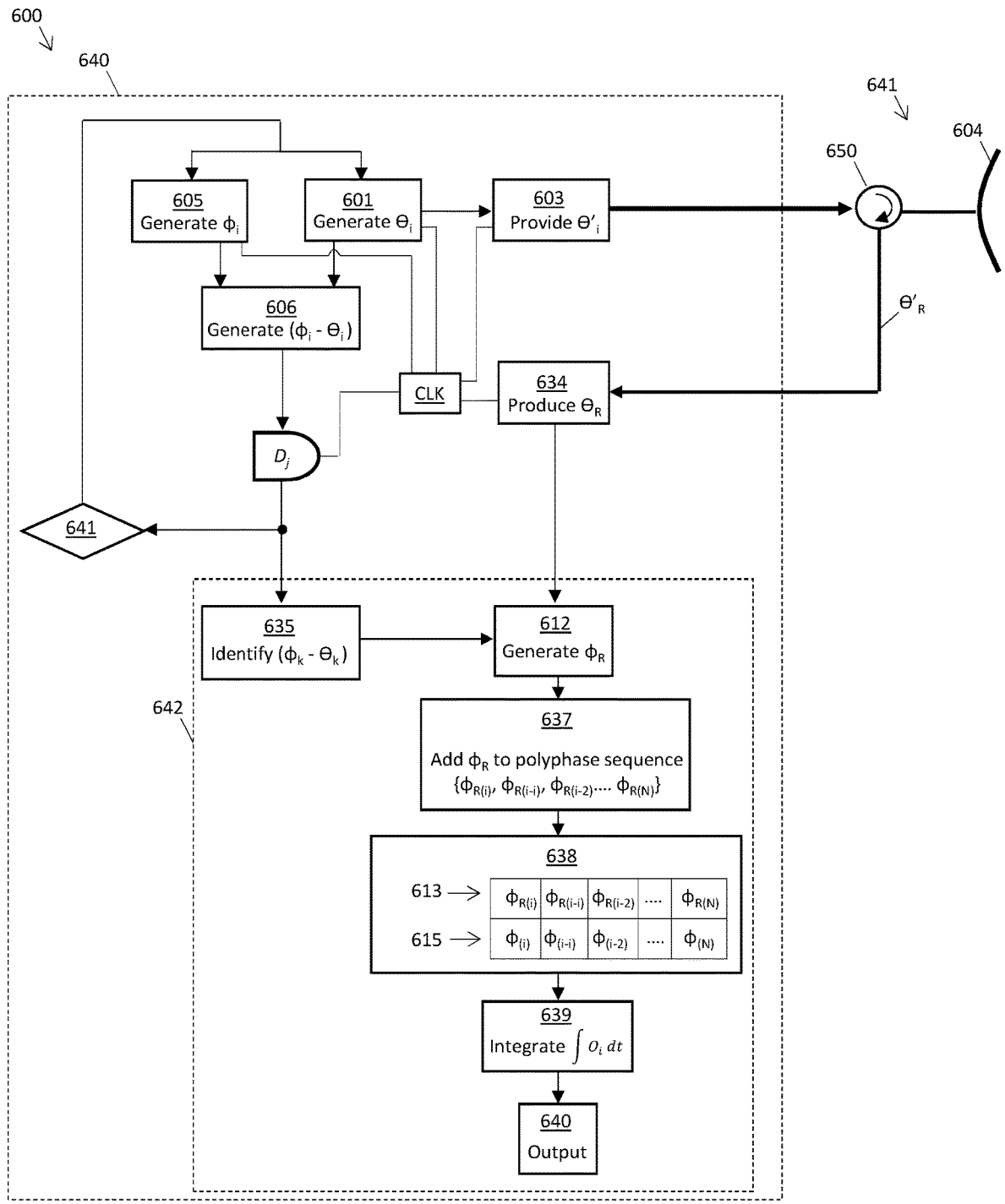
FIG. 6 illustrates another embodiment of the CW system.

Additionally provided and illustrated at FIG. 6 is an apparatus for a continuous wave radar system 600 comprising one or more digital processors 640, and a monostatic antenna system generally indicated at 641, with monostatic antenna system 641 comprising antenna 604 and circulator 650. The processors 640 are programmed to perform steps comprising generating a random subcode $\Theta_i$ at 601 and generating a polyphase subcode $\phi_i$ corresponding to the random subcode $\Theta_i$ at 605. In particular embodiments, the operations at 601 and 605 are generally synchronized via communication from a clock CLK, as illustrated. As before the polyphase subcode $\phi_i$ is a member of a set of polyphase subcodes having N number of members. Processors 640 communicate the subcode $\Theta_i$ and polyphase subcode $\phi_i$ to a corrections generator 606 for generation of a phase conversion parameter $(\phi_i-\Theta_i)$ corresponding to the subcode $\Theta_i$. Processors 640 further communicate the subcode $\Theta_i$ and modulate the subcode $\Theta_i$ producing modulated subcode $\Theta'_i$ at 603, and further communicate the modulated subcode $\Theta'_i$ to antenna system 641, typically via additional amplifying and conditioning components (not shown). Typically CLK is additionally in communication with operation 603 or antenna system 641 in order to enable transmission of the modulated subcode $\Theta'_i$ at a particular transmission time $t_i$.

Processors 640 further provide the phase conversion parameter $(\phi_i-\Theta_i)$ to each range gate $RG_j$ comprising a plurality of range gates, as previously discussed. Communication of the phase conversion parameter $(\phi_i-\Theta_i)$ occurs following a delay after the transmission time $t_i$, with the delay unique to the each range gate $RG_j$ as before. This is illustrated at FIG. 6, where processors 640 provide the phase conversion parameter $(\phi_i-\Theta_i)$ to a sequence of operations 642 following the delay $D_j$. The sequence of operations 642 is representative of operations previously discussed which occur within a given range gate $RG_j$. Having generated the random subcode $\Theta_i$, modulated subcode $\Theta'_i$, and polyphase subcode $\phi_i$ corresponding to a given subpulse width $\tau$, and having generated and provided the phase conversion parameter $(\phi_i-\Theta_i)$ to the sequence of operations 642, at 641, processors 640 repeat the processes and conduct 601, 603, 605, 606, and the appropriate delay $D_j$ generally for every subsequent subpulse width τ. This repetition typically occurs independently of any echo processing steps that occur within processors 640. Within the sequence of operations 642 and following the delay $D_j$, the phase conversion parameter $(\phi_i-\Theta_i)$ is provided to operation 635, which identifies the most recent phase conversion parameter $(\phi_k-\Theta_k)$. Typically the most recent phase conversion parameter $(\phi_k-\Theta_k)$ is the latest phase conversion parameter $(\phi_i-\Theta_i)$ received. Operation 635 communicates the most recent phase conversion parameter $(\phi_k-\Theta_k)$ to phase conversion operation 612.

As processors 640 conduct operations 601, 603, 605, 606, and $D_j$, processors 640 additionally receive modulated echo returns $\Theta'_R$ from antenna system 641, typically via additional amplifying and conditioning components (not shown). Processors 640 demodulates the modulated echo return $\Theta'_R$ at operation 634, generating demodulated subcode $\Theta_R$, as before. Processors 640 provide the demodulated subcode $\Theta_R$ to phase conversion operation 612 which converts the demodulated subcode $\Theta_R$ using the most recent phase conversion parameter $(\phi_k-\Theta_k)$ received from 635, producing an echo subcode $\phi_R$, as before. In some embodiments, CLK is in communication with operation 634 and delay $D_j$, in order to indicate when the demodulated subcode $\Theta_R$ is provided by operation 634 and provide an appropriate processing time $\Delta T_{P(j)}$ to be utilized in delay $D_j$.

Operation 637 adds the resulting echo subcode $\phi_R$ to a polyphase sequence comprising a string of subcodes, illustrated as $\{\phi_{R(i)}, \phi_{R(i-1)}, \phi_{R(i-2)} \ldots \phi_{R(N)}\}$ at FIG. 6. At operation 638, processors 640 correlate the updated polyphase sequence using the set of polyphase subcodes $\phi_{(i)}, \phi_{(i-1)}, \phi_{(i-2)} \ldots \phi_{(N)}$ utilized in operation 605 using, in certain embodiments, shift register 613 and reference register 615. The correlation provides an output $O_i$ which is communicated to integration operation 639. Integration operation 639 subsequently communicates the integrated output to output operation 640.

The method, system, and apparatus provided thereby discloses a manner by which a random CW waveform may be transmitted while enabling the recovery of polyphase subcodes $\{\phi_1, \phi_2, \phi_3, \ldots \phi_N\}$ advantageous for the purposes of correlation and pulse compression. The apparatus and methodology differs substantially from that employed by typical random radars transmitting randomly phase coded CW waveforms, which generally records and updates a series of echo subcodes received for comparison against a delayed replica for determination of RTT. Further, because the random transmitted waveform is typically correlated against the (also random) delayed replica, any ability to generate advantageous phase codes is lost. In contrast, the system, method, and apparatus disclosed here provides for transmission of a random CW waveform while also allowing the use of any phase code $\{\phi_1, \phi_2, \ldots \phi_N\}$ that lends itself to advantageous pulse compressions.

In a typical embodiment, each individual range gate $RG_j$ has an associated $D_{RG(j)}$ where the associated $D_{RG(j)}$ is equal to $(\tau \times j)+\Delta T_{P(j)}$, and the phase conversion parameter $(\phi_i-\Theta_i)$ is provided to the each individual range gate $RG_j$ such that $0.8 \leq D_j/D_{RG(j)} \leq 1.2$, where $D_j$ is the delay $D_j$ unique to the each individual range gate $RG_j$ and $D_{RG(j)}$ is the associated $D_{RG(j)}$. In certain embodiments, $0.9 \leq D_j/D_{RG(j)} \leq 1.1$, and in other embodiments, $0.95 \leq D_j/D_{RG(j)} \leq 1.05$. The associated processing time period $\Delta T_{P(j)}$ may differ among the various range gates $RG_j$, or may be a time period common to all range gates.

In other embodiments, the digital process, analog process, or combination used to generate the specific phase conversion parameter $(\phi_{i(S)}-\Theta_{i(S)})$ performs operations equivalent to $(\phi_{i(S)}-\Theta_{i(S)})=f_1(\phi_{i(S)}, \Theta_{i(S)})$ where $f_1$ is a mathematical function over at least some portion of a domain comprising $\phi_{i(S)}$ and $\Theta_{i(S)}$, and where $(\phi_{i(S)}-\Theta_{i(S)})$ is the specific phase conversion parameter $(\phi_{i(S)}-\Theta_{i(S)})$, $\phi_{i(S)}$ is the specific polyphase subcode $\phi_{i(S)}$, and $\Theta_{i(S)}$ is the specific random subcode $\Theta_{i(S)}$.

In another embodiment, phase conversion module 212 performs operations equivalent to $\phi_{R(S)}=f_2((\phi_k-\Theta_k)_{(S)}, \Theta_{R(S)})$ where $f_2$ is a mathematical function over at least some portion of a domain comprising $(\phi_k-\Theta_k)_{(S)}$ and $\Theta_{R(S)}$, and where when $0.8 \leq \Theta_{i(S)}/\Theta_{R(S)} \leq 1.2$ and $0.8 \leq (\phi_{i(S)}-\Theta_{i(S)})/(\phi_k-\Theta_k)_{(S)} \leq 1.2$, then $0.8 \leq \phi_{i(S)}/\phi_{R(S)} \leq 1.2$, where $\Theta_{i(S)}$ is one of the random subcodes $\Theta_i$ generated by the random wave form generator, $\phi_{i(S)}$ is the specific polyphase subcode $\phi_{i(S)}$ generated by the corrections generator for the $\Theta_{i(S)}$, $\Theta_{R(S)}$ is the specific demodulated subcode $\Theta_{R(S)}$, $(\phi_{i(S)}-\Theta_{i(S)})$ is the specific phase conversion parameter $(\phi_{i(S)}-\Theta_{i(S)})$ generated by the corrections generator for the $\Theta_{i(S)}$ and $\phi_{i(S)}$, and $(\phi_k-\Theta_k)_{(S)}$ is the specific most recent phase conversion parameter $(\phi_k-\Theta_k)_{(S)}$. In other embodiments, the function $f_2$ is substantially an inverse function of the function $f_1$ used by corrections generator 106, such that when $(\phi_{i(S)}-\Theta_{i(S)})=f_1(\phi_{i(S)}, \Theta_{i(S)})$ and a $\phi_0=f_2((\phi_{i(s)}-\Theta_{i(S)})_{(S)}, \Theta_{i(S)})$, then $0.8 \leq \phi_{i(S)}/(\phi_0 \leq 1.2$. In certain embodiments when $0.9 \leq \Theta_{i(S)}/\Theta_{R(S)} \leq 1.1$ and $0.9 \leq (\phi_{i(S)}-\Theta_{i(S)}/(\phi_k-\Theta_k)_{(S)} \leq 1.1$ then $0.9 \leq \phi_{i(S)}/\phi_{R(S)} \leq 1.1$, and in other embodiments when $0.95 \leq \Theta_{i(S)}/\Theta_{R(S)} \leq 1.05$ and $0.95 \leq (\phi_{i(S)}-\Theta_{i(S)}/(\phi_k-\Theta_k)_{(S)} \leq 1.05$ then $0.95 \phi_{i(S)}/\phi_{R(S)} \leq 1.05$. In some embodiments when $\phi_{i(S)}-\Theta_{i(S)})= f_1(\phi_{i(S)}, \Theta_{i(S)})$ and the $\phi_0=f_2((\phi_{i(s)}-\Theta_{i(S)})_{(S)}, \Theta_{i(S)})$, then $0.9 \leq \phi_{i(S)}/\phi_0 \leq 1.1$, and in further embodiments then $0.95 \leq \phi_{i(S)}/\phi_0 \leq 1.05$.

Additionally, in some embodiments, a "random subcode $\Theta_i$" means one of a plurality of random subcodes $\Theta_i$, where the plurality of random subcodes $\Theta_i$ defines a plurality of phases over some time period and the plurality of phases over the time period generally comprises a probability density function $(\mu,\sigma^2)$ having a mean $\mu$ and a variance $\sigma^2$, such as a Normal, Beta, Uniform, Weibull, or other distributions known in the art. In some embodiments, each phase p comprising the plurality of phases satisfies a relationship $0.8 \leq p/x_{PDF} \leq 1.2$, where $x_{PDF}$ is a point on the probability density function $(\mu,\sigma^2)$. In other embodiments $0.9 \leq p/x_{PDF} \leq 1.1$, and in other embodiments $0.95 \leq p/x_{PDF} \leq 1.05$. The generation of such random phases may be conducted using means known in the art, such as noise-generating microwave sources, digital generation using a processor, or others. See e.g., Axellson, "Noise Radar Using Random Phase and Frequency Modulation," *IEEE Transactions on Geoscience and Remote Sensing* 42(11) (2004), and see K. Kulpa, *Signal Processing in Noise Waveform Radar* (2013), and see G. R. Cooper and C. D. McGillem, Random Signal Radar, Final Rep. TR-EE67-11 (1967), among many others.

Further and in other embodiments, "modulated subcode $\Theta'_i$" means an electromagnetic signal having a frequency and a phase over a subpulse width τ, where the phase defines a value of the modulated subcode $\Theta'_i$ at some point during the subpulse width τ, and where the phase is based on a random subcode $\Theta_i$. In certain embodiments, the phase defines the value of the modulated subcode $\Theta'_i$ at the commencement of the subpulse width τ. In certain embodiments, the phase is a mathematical function of the random subcode $\Theta_i$. In other embodiments, a parameter $P_0$ is a function of a specific random subcode $\Theta_0$) such that $P_0=f_3(\Theta_{i(P)})$ where $\Theta_{i(P)}$ denotes the specific random subcode $\Theta_{i(P)}$ and where $f_3$ is a mathematical function over at least some portion of a domain comprising $\Theta_{i(P)}$, and the phase for the specific random subcode $\Theta_{i(P)}$ has a value such that $0.8 \leq p/P_0 \leq 1.2$ in one embodiment, $0.9 \leq p/P_0 \leq 1.1$ in a another embodiment, and $0.95 \leq p/P_0 \leq 1.05$ in a further embodiment, where p is the phase of the modulated subcode $\Theta'_i$. In other embodiments, the frequency of the modulated subcode $\Theta'_i$ is constant over the subpulse width $\tau$.

Additionally, it is understood that although the foregoing discussions discuss generation of an individual random subcode $\Theta_i$, in preparation for transmitting a specific modulated subcode $\Theta'_i$ at a transmission time $t_i$, and generation of an individual polyphase subcode $\phi_i$ corresponding to the specific modulated subcode $\Theta'_i$, and generation of an individual phase correction parameter $(\phi_i-\Theta_i)$ corresponding to the specific modulated subcode $\Theta'_i$, it is not required that generation of the individual random subcode $\Theta_i$, the individual polyphase subcode $\phi_i$, or the individual phase correction parameter $(\phi_i-\Theta_i)$ be temporally related to the transmission time $t_i$ of the specific modulated subcode $\Theta'_i$, except to the extent necessary for a modulator such as 103 to upconvert a random subcode $\Theta_i$ to a modulated subcode $\Theta'_i$, and for a corrections generator such as 106 to provide a properly delayed phase correction parameter $(\phi_i-\Theta_i)$ comprising the random subcode $\Theta_i$ corresponding to the modulated subcode $\Theta'_i$.

Further, it is understood that CW system 100 is typically intended to operate as a continuous wave radar system exhibiting a high duty cycle, where here "duty cycle" means the proportion of a given time period when transmitting antenna 104 emits modulated subcodes $\Theta'_i$. In certain embodiments. CW System 100 exhibits a duty cycle of at least ½, in other embodiments at least 7/10, and in further embodiments at least 9/10.

Further it is understood that, although FIG. 1 depicts a bistatic system comprising both transmitting antenna 104 and a separate receiving antenna 108, this is not intended as a limitation on the disclosure. Alternatively, CW system 100 could be a monostatic system where transmitting antenna 104 and receiving antenna 108 are a single antenna, and communications from modulator 103 and to demodulator 109 are directed using a circulator, as is known in the art of CW radar systems.

Further it is understood that the functions of various components described herein may be performed using analog or digital means. In certain embodiments, CW system 100 comprises one or more digital processors, and the one or more digital processors are programmed with instructions for performing some or all of the functions of random waveform generator 101, modulator 103, polyphase subcode generator 105, corrections generator 106, the plurality of range gates $RG_j$, or various combinations thereof.

Figure 7:
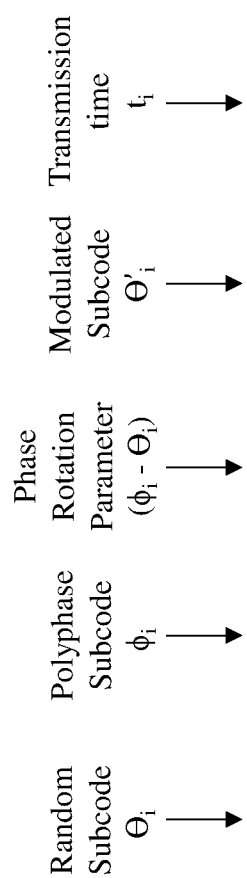
FIG. 7 illustrates exemplary parameters utilized by the CW system.
Figure 8:
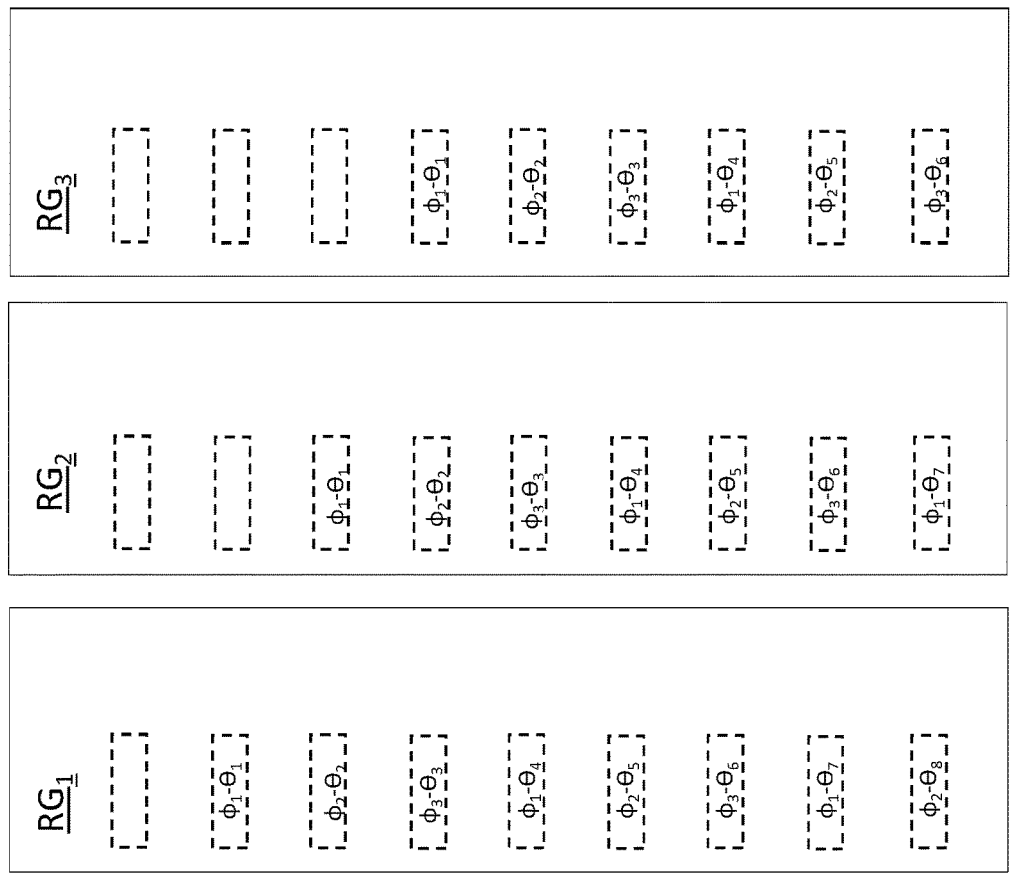
FIG. 8 illustrates delayed phase conversion parameters $(\phi_i-\Theta_i)$ provided to a plurality of range gates.
Figure 8:
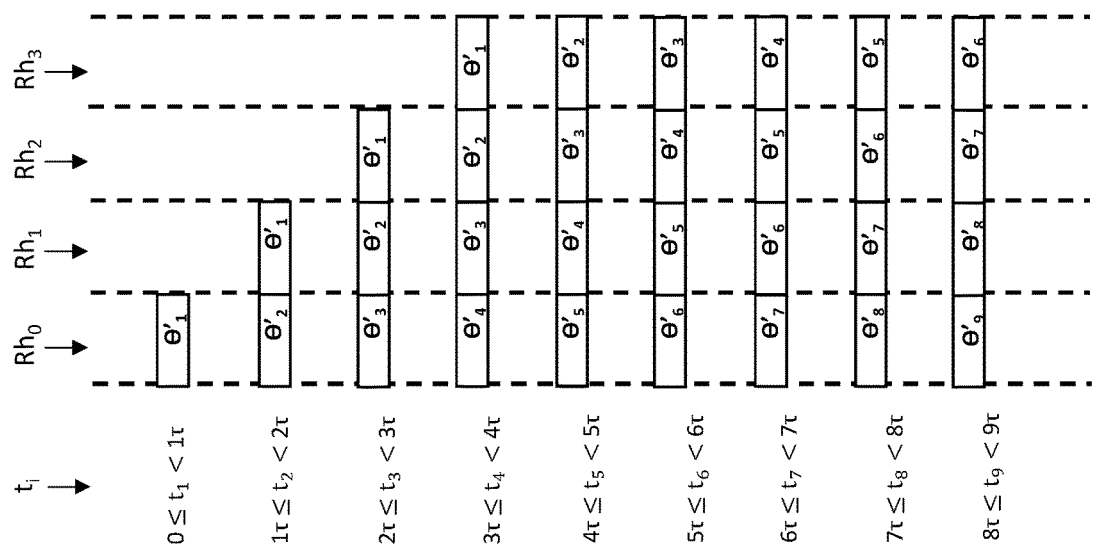

FIGS. 7 and 8 illustrate a specific embodiment of the manner in which the random waveform generator 101, polyphase subcode generator 105, and corrections generator 106 of CW system 100 act to provide a properly delayed most recent phase conversion parameter $(\phi_k-\Theta_k)$ to each range gate in order to allow recovery of underlying polyphase subcodes $\{\phi_1, \phi_2, \phi_3, \ldots \phi_N\}$. FIG. 7 illustrates a series of parameters generally indicated by random subcode $\Theta_i$, polyphase subcode $\phi_i$, phase conversion parameter $(\phi_i-\Theta_i)$, and modulated subcode $\Theta'i$ generated by CW system 100 in support of transmitting the modulated subcodes via transmitting antenna 104 over time periods generally indicated by Transmission time $t_i$. In support of transmission at the Transmission time $t_i$ of $0 < t_1 \leq 1\tau$, random waveform generator 101 generates the random subcode $\Theta_1$, and polyphase subcode generator 105 produces the polyphase subcode $\phi_1$ corresponding to the random subcode $\Theta_1$. Random waveform generator 101 communicates the random subcode $\Theta_1$ and polyphase subcode generator 105 communicates the polyphase subcode $\phi_1$ to corrections generator 106, which generates the phase conversion parameter $(\phi_1-\Theta_1)$ corresponding to the random subcode $\Theta_1$. Additionally, random waveform generator 101 communicates random subcode $\Theta_1$ to modulator 103 which upconverts random subcode $\Theta_1$ to modulated subcode $\Theta'_1$, and transmitting antenna 104 transmits the modulated subcode $\Theta'_1$ over the transmission time $0 < t_1 \leq 1\tau$. Similarly in support of transmission at the Transmission time $t_i$ of $1\tau < t_1 \leq 2\tau$, random waveform generator 101 generates random subcode $\Theta_2$, polyphase subcode generator 105 produces polyphase subcode $\phi_2$, corrections generator 106 generates phase conversion parameter $(\phi_2-\Theta_2)$, and further random waveform generator 101 communicates random subcode $\Theta_2$ to modulator 103 for upconversion and transmission of modulated subcode $\Theta'_2$ via transmitting antenna 104 over Transmission time $1\tau < t_2 \leq 2\tau$. Similar operations occur for transmission of modulated subcode $\Theta'_3$ over $2\tau < t_3 \leq 3\tau$, modulated subcode $\Theta'_4$ over $3\tau < t_4 \leq 4\tau$, modulated subcode $\Theta'_5$ over $4\tau < t_5 \leq 5\tau$, modulated subcode $\Theta'_6$ over $5\tau < t_6 \leq 6\tau$, modulated subcode $\Theta'_7$ over $6\tau < t_7 \leq 7\tau$, modulated subcode $\Theta'_8$ over $7\tau < t_8 \leq 8\tau$, and modulated subcode $\Theta'_9$ over $8\tau < t_9 \leq 9\tau$. As previously discussed, all random subcode $\Theta_i$ are random phases, and all modulated subcodes $\Theta'_i$ transmitted are randomly phase coded waveforms. Note also that in this illustration, polyphase subcode generator 105 utilizes a set of repeating polyphase subcodes $\{\phi_1, \phi_2, \phi_3\}$, such that corrections generator 106 generates sequential phase conversion parameters of $(\phi_1-\Theta_1)$, $(\phi_2-\Theta_2)$, $(\phi_3-\Theta_3)$, $(\phi_1-\Theta_4)$, $(\phi_2-\Theta_5)$, $(\phi_3-\Theta_6)$, $(\phi_1-\Theta_7)$, $(\phi_2-\Theta_8)$, and $(\phi_3-\Theta_9)$.

FIG. 8 illustrates the transmission of the modulated subcodes $\Theta'_i$ from transmitting antenna 104 over the transmission periods generally indicated by $t_i$. For illustration, the transmission commences with transmitting antenna 104 transmitting the modulated subcode $\Theta'_i$ over $0 < t_1 \leq 1\tau$, and the presence of $\Theta'_1$ as a waveform physically present within a range interval is similarly illustrated at FIG. 8 using range intervals generally indicated by $RH_0$, $RH_1$, $RH_2$, and $RH_3$, whereas before the range intervals correspond to a distance substantially equivalent to $\tau c/2$. Accordingly, transmitting antenna 104 transmits modulated subcode $\Theta'_2$ over $1\tau < t_2 \leq 2\tau$, modulated subcode $\Theta'_3$ over $2\tau < t_3 \leq 3\tau$, and so on to the last illustrated transmission where transmitting antenna 104 transmits modulated subcode $\Theta'_9$ over $8\tau < t_2 \leq 9\tau$.

FIG. 8 additionally illustrates a plurality of range gates $RG_1$, $RG_2$, and $RG_3$. The transmission times $t_i$ of FIG. 8 apply to all parameters horizontally level with a given $t_i$, and the phase conversion parameters sent to the plurality of range gates $RG_1$, $RG_2$, and $RG_3$ from corrections generator 106 following appropriate delay are additionally indicated at each time and for each of $RG_1$, $RG_2$, and $RG_3$. The particular phase conversion parameters indicated for each range gate and at each time are the most recent phase conversion parameters $(\phi_k-\Theta_k)$ discussed earlier and received by phase conversion module 212, based on the appropriate range delay for a given range gate. For example, for the $t_i$ commencing at zero and treating a $\Delta T_{P(1)}$ as equal to zero for the purpose of illustration, $RG_1$ receives the phase correction $(\phi_1-\Theta_1)$ during the period $1\tau < t_3 \leq 2\tau$, based on the delay $\tau(1)+0=1\tau$. Similarly, for the $t_i$ commencing at $1\tau$, $RG_1$ receives phase correction $(\phi_2-\Theta_2)$ during the period $2\tau < t_3 \leq 3\tau$ based on the appropriate delay $1\tau$, and, for the $t_i$ commencing at $2\tau$, receives $(\phi_3-\Theta_3)$ during the period $3\tau < t_4 \leq 4\tau$ based on the appropriate delay $1\tau$. $RG_1$ continues to receive most recent phase corrections having the appropriate 1τ delay for each corresponding modulated subcode $\Theta'_i$ transmitted, through to reception of $(\phi_2-\Theta_8)$ during period $8\tau<t_9\leq9\tau$.

In similar fashion, for the $t_i$ commencing at zero and with a $\Delta T_{P(2)}$ equal to zero, $RG_2$ receives the phase correction $(\phi_1-\Theta_1)$ during the period $2\tau<t_3\leq3\tau$, based on the delay $\tau(2)+0=2\tau$. For the $t_i$ commencing at 1τ, $RG_2$ receives phase correction $(\phi_2-\Theta_2)$ during the period $3\tau<t_4\leq4\tau$ based on the appropriate delay 2τ, and for the $t_i$ commencing at 2τ, receives $(\phi_3-\Theta_3)$ during the period $4\tau<t_5\leq5\tau$ based on the appropriate delay 2τ, and so on through to reception of $(\phi_1-\Theta_7)$ during period $8\tau<t_9\leq9\tau$. In like manner, for the $t_i$ commencing at zero and with $\Delta T_{P(3)}$ equal to zero, $RG_3$ receives the phase correction $(\phi_1-\Theta_1)$ during the period $3\tau<t_4\leq4\tau$, based on the delay $\tau(3)+0=3\tau$, and for the $t_i$ commencing at 1τ receives phase correction $(\phi_2-\Theta_2)$ during the period $4\tau<t_5\leq5\tau$ based on the appropriate delay 3τ, and for the $t_i$ commencing at 2τ, receives $(\phi_3-\Theta_3)$ during the period $5\tau<t_6\leq6\tau$ based on the appropriate delay 3τ. As previously discussed, each respective range gate $RG_1$, $RG_2$, and $RG_3$ utilizes its most recent phase conversion parameter $(\phi_k-\Theta_k)$ received from corrections generator 106 to phase rotate any demodulated subcode $\Theta_R$ received from demodulator 109, in order to generate an echo subcode $\phi_R$ from the demodulated subcode $\Theta_R$.

Figure 9:
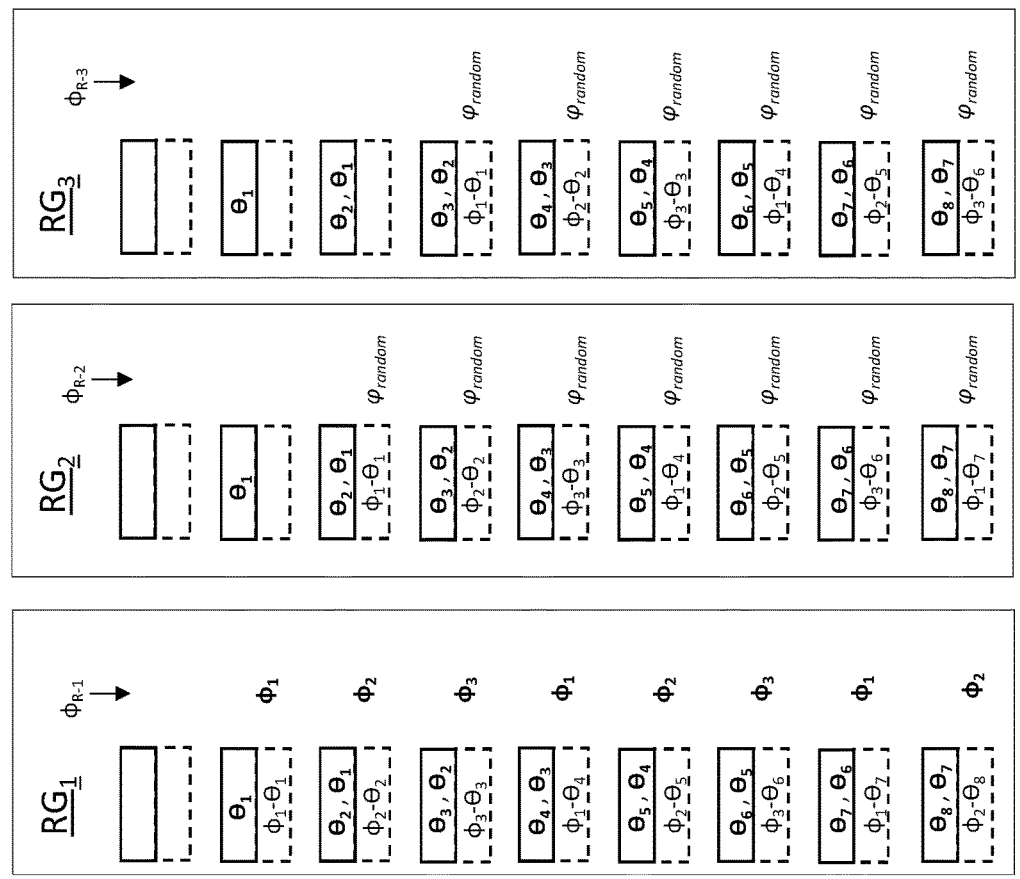
FIG. 9 illustrates a response of the plurality of range gates to echo returns from a first object.
Figure 9:
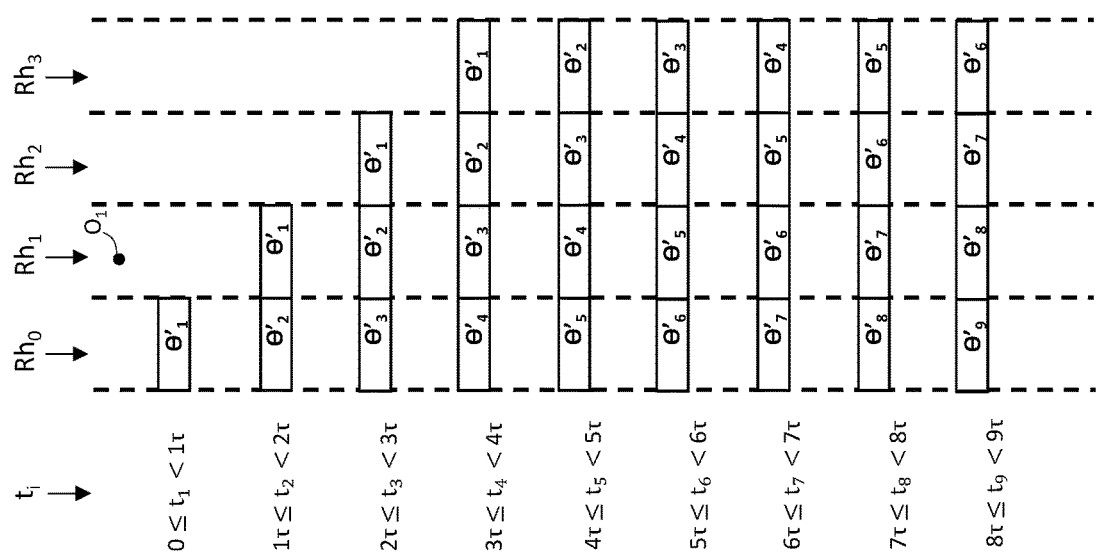

The impact of the phase conversions based on the properly delayed phase correction parameters $(\phi_i-\Theta_i)$ is illustrated at FIG. 9, which similar to FIG. 8 illustrates the transmission of modulated subcodes $\Theta'_i$ from transmitting antenna 104, range intervals $RH_0$, $RH_1$, $RH_2$, and $RH_3$, range gates $RG_1$, $RG_2$, and $RG_3$, and also the properly delayed most recent phase conversion parameters $(\phi_k-\Theta_k)$ for each range gate corresponding to the listed transmission times. FIG. 9 additionally illustrates demodulated subcodes $\Theta_R$ provided by demodulator 109 and arising from an object $O_1$ located in range interval $RH_1$. Based on the range intervals of τc/2 and the inherent round trip time (RTT) from the object $O_1$ in $RH_1$, and for a transmission of a modulated subcode $\Theta'_i$ commencing at $t_i$ of zero, and again for illustration using a processing time $\Delta T_P$ equal to zero, each range gate $RG_1$, $RG_2$, and $RG_3$ is expected to initially receive the demodulated subcode $\Theta_1$ of the echo from demodulator 109 during the time interval over $1\tau<t_2\leq2\tau$, as illustrated for each range gate. In similar fashion and based on the expected RTT corresponding to the object $O_1$, $RG_1$, $RG_2$, and $RG_3$ each receive the demodulated subcode $\Theta_2$ of the echo during $2\tau<t_3\leq3\tau$. Additionally at $2\tau<t_3\leq3\tau$ and due to the range interval of τc/2, $RG_1$, $RG_2$, and $RG_3$ also receives the back half of the demodulated subcode $\Theta_1$, as indicated. Similarly and for similar reasons, $RG_1$, $RG_2$, and $RG_3$ receive demodulated subcode $\Theta_3$ and $\Theta_2$ of the echo during $3\tau<t_5\leq4\tau$, the demodulated subcode $\Theta_4$ and $\Theta_3$ of the echo during $4\tau<t_5\leq5\tau$, and so on to the reception of the demodulated subcode $\Theta_8$ and $\Theta_7$ of the echo during $8\tau<t_9\leq9\tau$. Similar to FIG. 8, for each range gate, the most recent phase conversion parameters $(\phi_k-\Theta_k)$ provided to the phase conversion module 212 of each respective range gate is additionally indicated. For illustrative purposes at FIG. 9, leakage signals contributions are ignored but will be discussed subsequently.

As can be recognized at FIG. 9, beginning at $1\tau<t_2\leq2\tau$, for an object $O_1$ located within $RH_1$, the most recent most recent phase conversion parameter $(\phi_k-\Theta_k)$ provided to $RG_1$ in conjunction with the demodulated subcode $\Theta_R$ present at the range gates allows the phase conversion module of $RG_1$ to phase rotate the demodulated subcode $\Theta_R$ and produce an echo subcode $\phi_{R-1}$ generally equivalent to one of the repeating $\phi_1$, $\phi_2$, or $\phi_3$ polyphase subcodes utilized by polyphase subcode generator 105 in this example. For example, phase conversions by a phase conversion module such as 212 would substantially produce echo subcodes $\phi_{R-1}$ of $\phi_1$ at $1\tau<t_3\leq2\tau$, $\phi_2$ at $2\tau<t_3\leq3\tau$, $\phi_3$ at $3\tau<t_4\leq4\tau$, again $\phi_1$ at $4\tau<t_5\leq5\tau$, $\phi_2$ at $5\tau<t_6\leq6\tau$, $\phi_3$ at $6\tau<t_7\leq7\tau$, and again $\phi_1$ at $7\tau<t_8\leq8\tau$, and $\phi_2$ at $8\tau<t_9\leq9\tau$. Relative to a shift register such as 213 and a reference register 215 comprising the $\phi_1$, $\phi_2$, and $\phi_3$ polyphase subcodes, matched filter 214 would generate optimized pulse compressions generally each time the phase conversion module 212 adds the resulting echo subcode $\phi_{R-1}$ to the string of subcodes and $\{\phi_1, \phi_2, \phi_3\}$ are ordered within shift register 213. Meanwhile at FIG. 9, because of the delayed phase conversion parameters $(\phi_k-\Theta_k)$ present at $RG_2$ and $RG_3$, phase conversions do not produce one of $\phi_1$, $\phi_2$, or $\phi_3$ but rather generate another random subcode $\varphi_{random}$, and the respective matched filters of those range gates substantially generate noise signals. Thus for the object $O_1$ within the range interval $RH_1$, the properly delayed phase conversion parameters $(\phi_i-\Theta_i)$ provided to each range gate generates pulse compression in the appropriate range bin while generally resulting in noise generation in other range bins.

Figure 10:
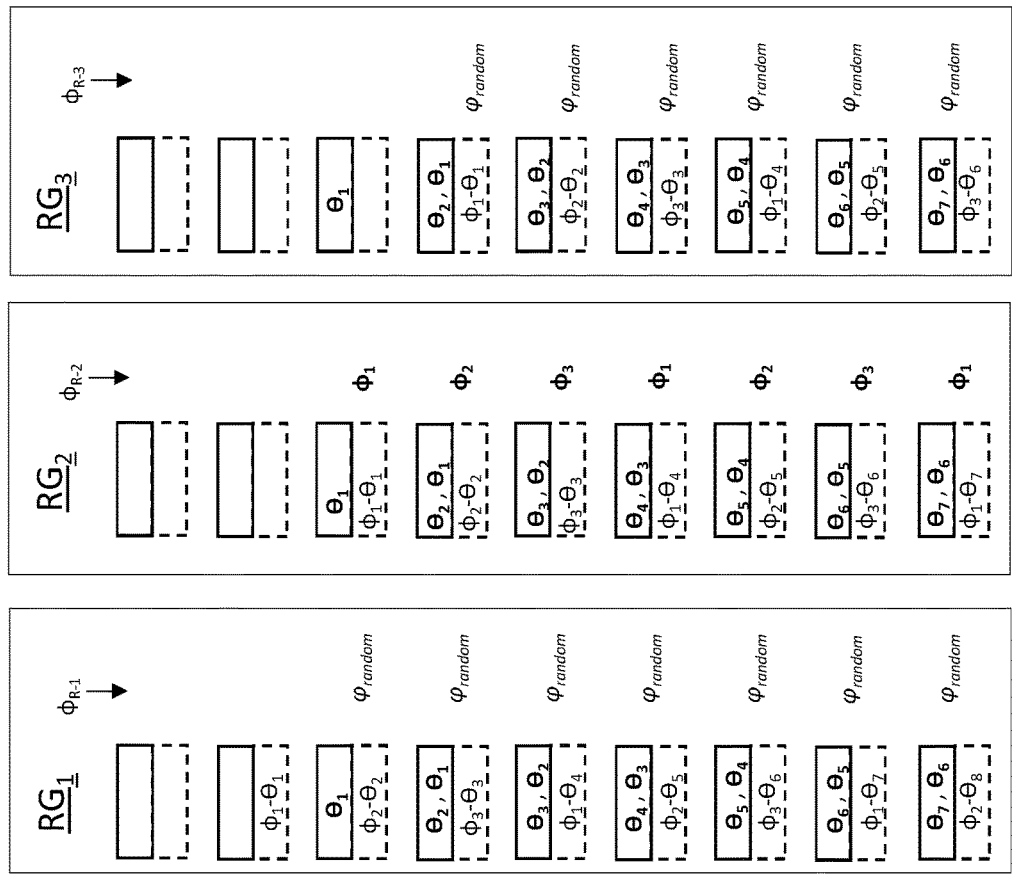
FIG. 10 illustrates a response of the plurality of range gates to echo returns from a second object.
Figure 10:
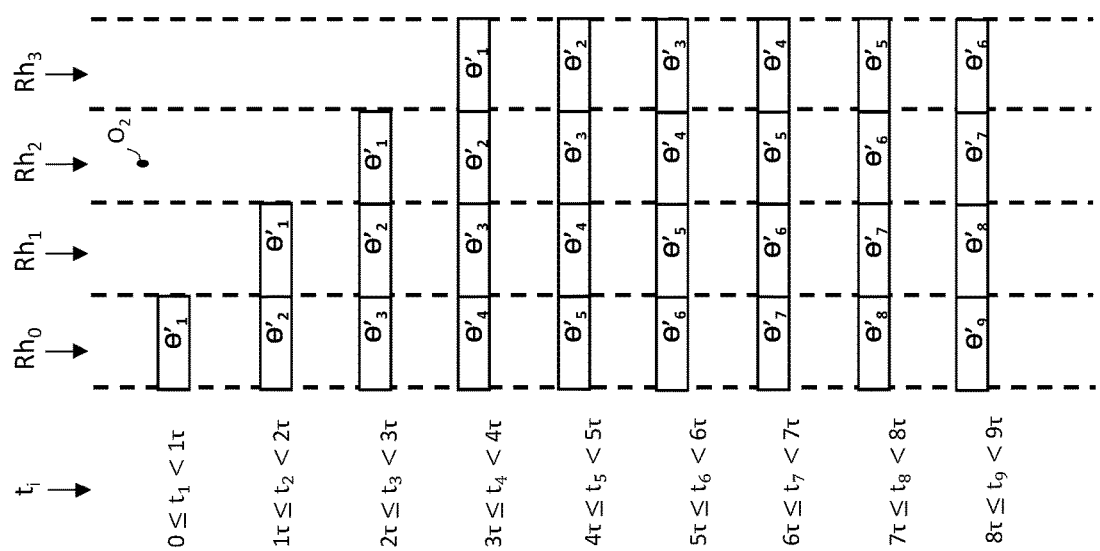

FIG. 10 illustrates the impact of the properly delayed phase conversion parameters $(\phi_i-\Theta_i)$ based on demodulated subcodes $\Theta_R$ provided by demodulator 109 and arising from an object $O_2$ located in range interval $RH_2$. As illustrated, beginning at $2\tau<t_3\leq3\tau$, for the object $O_2$ within $RH_2$, the most recent most recent phase conversion parameter $(\phi_k-\Theta_k)$ provided to $RG_2$ allows the phase conversion module of $RG_2$ to phase rotate the demodulated subcode $\Theta_R$ and produce echo subcodes $\phi_{R-2}$ generally equivalent to one of $\phi_1$, $\phi_2$, or $\phi_3$. The properly delayed phase conversion parameters $(\phi_i-\Theta_i)$ provided to the remaining range gates produce additional random subcodes $\varphi_{random}$.

Figure 11:
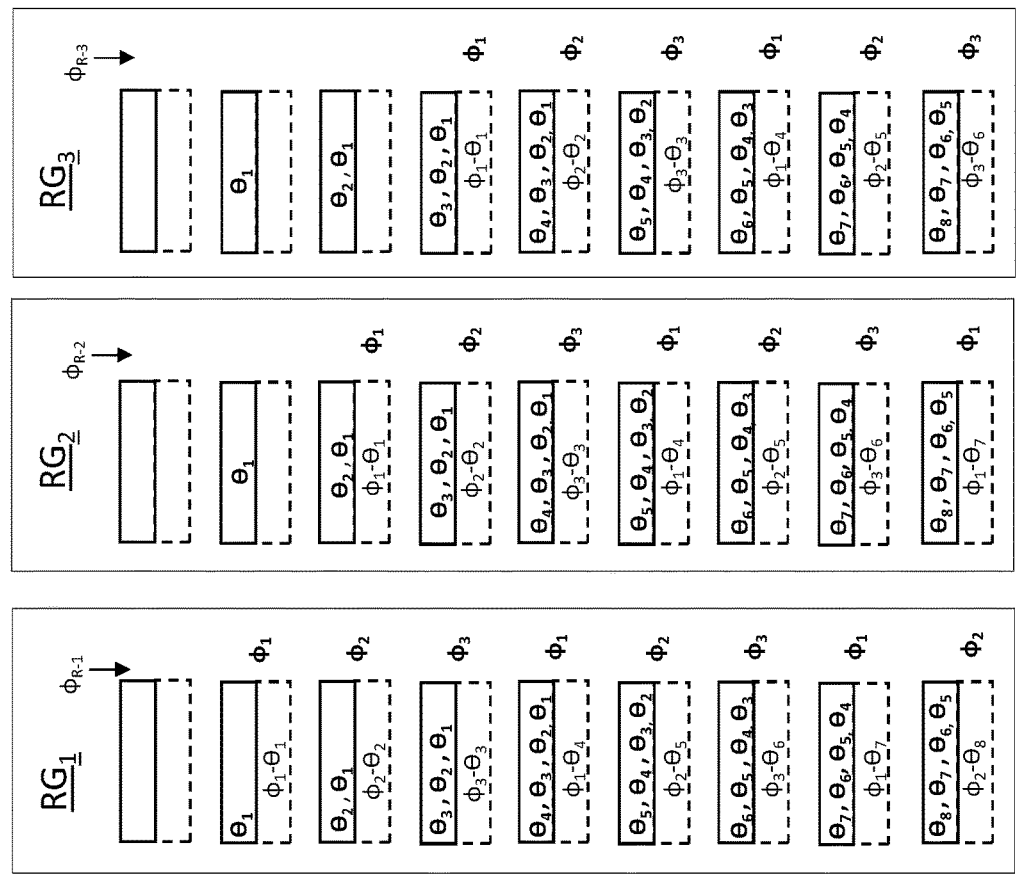
FIG. 11 illustrates a response of the plurality of range gates to echo returns from multiple objects.
Figure 11:
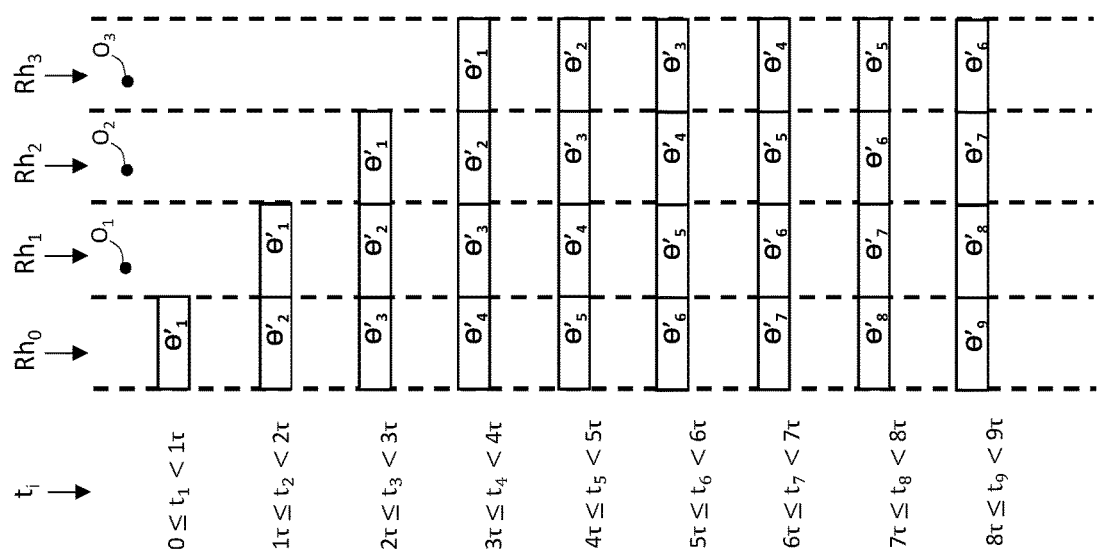

FIG. 11 illustrates the impact of the properly delayed phase conversion parameters $(\phi_i-\Theta_i)$ when CW system receives demodulated subcodes $\Theta_R$ provided by demodulator 109 and arising concurrently from an object $O_1$ in range interval $RH_1$, an object $O_2$ in range interval $RH_2$, and an object $O_3$ in range interval $RH_3$. As before, based on range intervals of τc/2 and the expected RTT for $O_1$ in $RH_1$, each range gate would initially receive the demodulated subcode $\Theta_1$ during the time interval over $1\tau<t_2\leq2\tau$, and chronologically receive $\Theta_2$ through $\Theta_8$ over the remaining time intervals illustrated, as well as the back half during subsequent time periods as before. Similarly and in addition, and based on the expected RTT for $O_2$ in $RH_2$, each range gate would further begin receiving the demodulated subcode $\Theta_1$ during the time interval over $2\tau<t_3\leq3\tau$, and due to continuing echoes from $O_2$ chronologically receive $\Theta_1$ through $\Theta_7$ over the remaining time intervals illustrated. Further, and based on the expected RTT for $O_3$ in $RH_3$, each range gate would additionally begin receiving the demodulated subcode $\Theta_1$ during the time interval over $3\tau<t_4\leq4\tau$, and due to continuing echoes from $O_3$ chronologically receive $\Theta_2$ through $\Theta_6$ over the remaining time intervals illustrated. As a result, each range gates receives multiple demodulated echoes. However, due to the properly delayed phase conversion parameters $(\phi_i-\Theta_i)$ also illustrated at FIG. 11 for each range gate, the subsequent phase conversions of $RG_1$ will largely produce echo subcodes $\phi_{R-1}$ approximating $\phi_1$ at $1\tau<t_2\leq2\tau$, $\phi_2$ at $2\tau<t_3\leq3\tau\phi_3$ at $3\tau<t_4\leq4\tau$, $\phi_1$ at $4\tau<t_5\leq5\tau$, $\phi_2$ at $5\tau<t_6\leq6\tau$, $\phi_3$ at $6\tau<t_7\leq7\tau$, $\phi_1$ at $7\tau<t_8\leq8\tau$, and $\phi_2$ at $8\tau<t_9\leq9\tau$, while the phase conversions of $RG_2$ will largely produce echo subcodes $\phi_{R-2}$ approximating $\phi_1$ at $2\tau<t_3\leq3\tau$, $\phi_2$ at $3\tau<t_4\leq4\tau$, $\phi_3$ at $4\tau<t_5\leq5\tau$, $\phi_1$ at $5\tau<t_6\leq6\tau$, $\phi_2$ at $6\tau<t_7\leq7\tau$, $\phi_3$ at $7\tau<t_8\leq8\tau$, and $\phi_1$ at $8\tau<t_9\leq9\tau$, while the phase conversions of $RG_3$ will largely produce echo subcodes $\phi_{R-3}$ approximating $\phi_1$ at $3\tau<t_4\leq4\tau$, $\phi_2$ at $4\tau<t_5\leq5\tau$, $\phi_3$ at $5\tau<t_6\leq6\tau$, $\phi_1$ at $6\tau<t_7\leq7\tau$, $\phi_2$ at $7\tau<t_8\leq8\tau$, and $\phi_3$ at $8\tau<t_9\leq9\tau$. Thus, as disclosed, CW system 100 provides the significant capability of enabling the recovery of an underlying phase code $\{\phi_1, \phi_2, \ldots \phi_N\}$ following return of a modulated echo $\Theta'_R$, using a randomly phase coded CW waveform.

Figure 12:
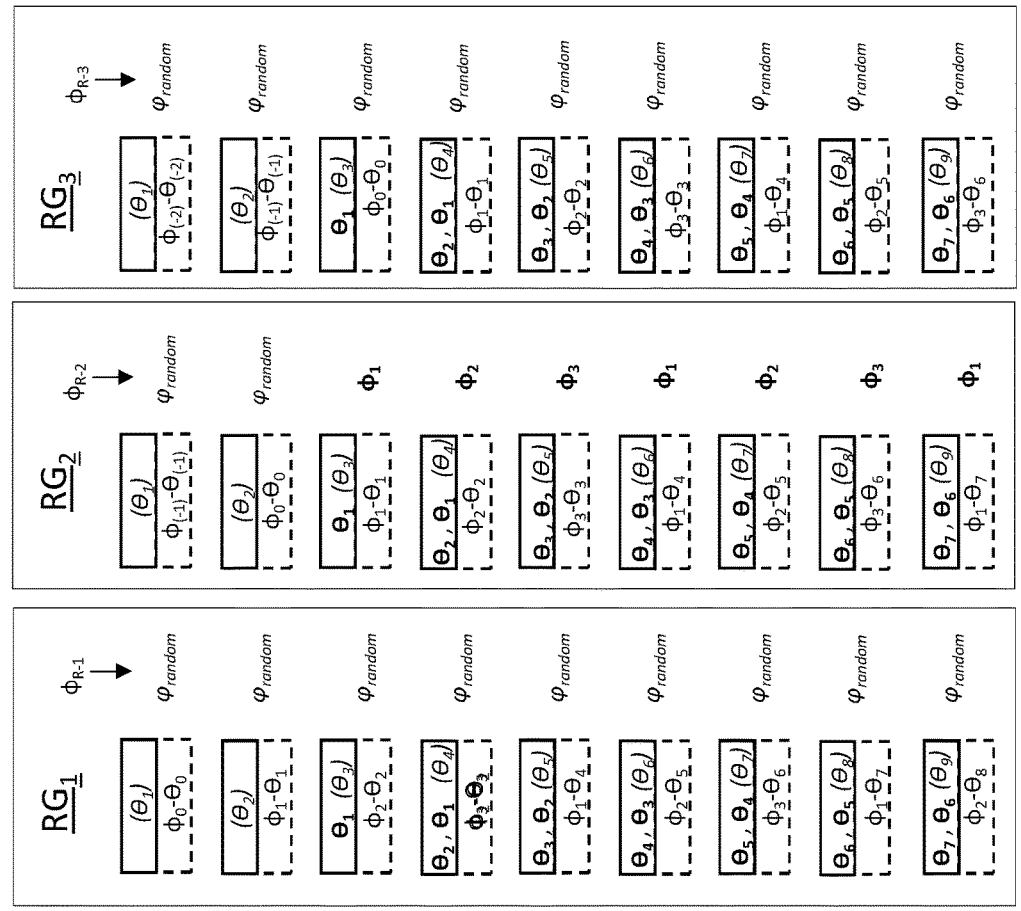
FIG. 12 illustrates a response of the plurality of range gates to echo returns from an objects in the presence of signal leakage.
Figure 12:
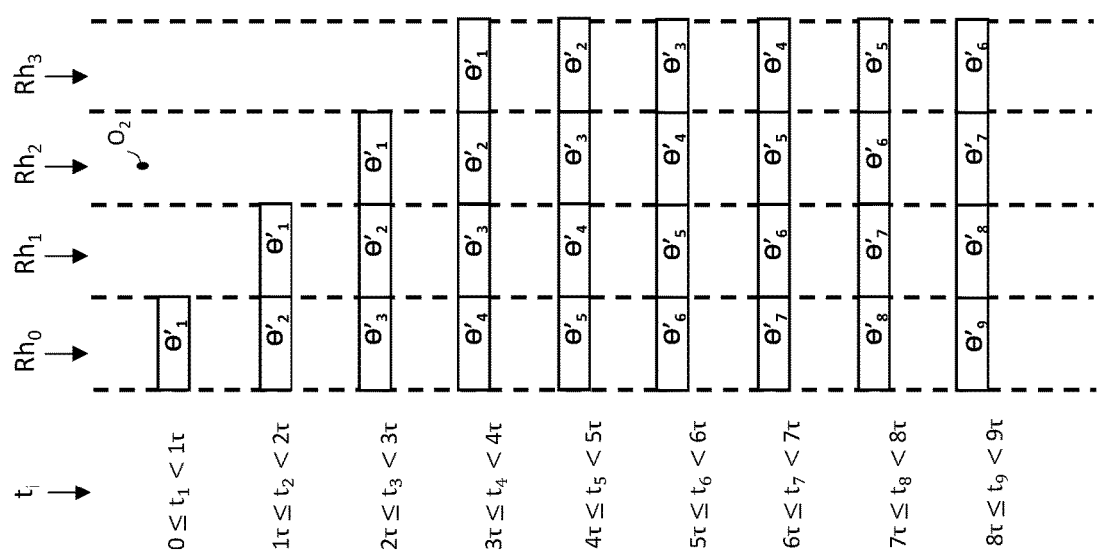

In addition to the advantage of enabling recovery of the underlying phase code $\{\phi_1, \phi_2, \ldots \phi_N\}$, the use of the delayed phase code corrections in the manners described additionally has the significant advantage of allowing for CW transmission while minimizing the impact of signal leakage. As is understood and as discussed above, in any CW system, during an analogous transmission of a modulated subcode $\Theta'_i$ at a time $t_i$, some degree of leakage of the modulated subcode $\Theta'_i$ is experienced by the receiving components of the system, degrading the ability of the receiving components to separate and discriminate a modulated echo $\Theta'_R$. However, the particular manner of providing phase conversion parameters to the respective range gates provided by this disclosure act to significantly mitigate the impact of this leakage in any subsequent processing. This is illustrated at FIG. 12 which, similar to FIG. 10, illustrates demodulated subcodes $\Theta_R$ provided to $RG_1$, $RG_2$, and $RG_3$ arising from an object $O_2$ located in range interval $RH_2$. In addition, in parenthesis and italicized, leakage signals received by each range gate are also indicated based on the current modulated subcode $\Theta'_i$ being transmitted via transmitting antenna 104. FIG. 12 also illustrates the properly delayed phase conversion parameters $(\phi_i-\Theta_i)$ provided to each range gate $RG_j$, including those phase conversion parameters that correspond to prior modulated subcodes $\Theta'_i$ (not shown) that preceded the transmission of $\Theta'_1$ during $0<t_1\leq1\tau$. The prior phase conversion parameters which precede $(\phi_1-\Theta_1)$ are indicated as $(\phi_0-\Theta_0)$, $(\Theta_{(-1)}-\Theta_{(-1)})$, and $(\phi_{(-2)}-\Theta_{(-2)})$. At FIG. 12, and as a result of the properly delayed phase conversion parameters provided to each range gate, conversion of the leakage signals using the most recent phase conversion parameter $(\phi_k-\Theta_k)$ at each respective range gate acts to generate another random subcode $\varphi_{random}$, rather than one of $\phi_1$, $\phi_2$, or $\phi_3$. However, beginning at $2\tau<t_3\leq3\tau$ as before, for the object $O_2$ within $RH_2$, the most recent most recent phase conversion parameter $(\phi_k-\Theta_k)$ provided to $RG_2$ allows the phase conversion module of $RG_2$ to phase rotate the demodulated subcode $\Theta_R$ and produce echo subcodes (1*m*-2 generally equivalent to one of $\phi_1$, $\phi_2$, or $\phi_3$. The properly delayed phase conversion parameters $(\phi_i-\Theta_i)$ thereby significantly mitigate the impact of any leakage signals on CW system 100 that arise from the modulated subcode $\Theta'_i$ currently being transmitted.

Thus, provided here is method, system, and apparatus by which a random CW radar waveform may be transmitted while enabling the recovery of polyphase subcodes $\{\phi_1, \phi_2, \phi_3, \ldots \phi_N\}$ advantageous for the purposes of correlation and pulse compression. The CW system transmits and receives a random waveform while avoiding the necessary use of a delayed replica for RTT determination, by providing properly delayed phase conversion parameters $(\phi_i-\Theta_i)$ from a corrections generator to various range gates $RG_j$ comprising a plurality of range gates. The associated methodology of the CW radar system has the significant advantage of enabling recovery of the underlying phase code $\{\phi_1, \phi_2, \ldots \phi_N\}$ associated with a given $\{\Theta_1, \Theta_2, \ldots \Theta_N\}$ series of modulated subcodes $\Theta'_i$ transmitted, based on the phase conversion parameters $(\phi_i-\Theta_i)$ appropriately delayed and provided by the corrections generator. This allows use of any phase code $\{\phi_1, \phi_2, \ldots \phi_N\}$ that lends itself to advantageous pulse compressions while concurrently enabling transmission of a randomly phase-coded waveform.

Accordingly, this description provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

It is to be understood that the above-described arrangements are only illustrative of the application of the principles of the present invention and it is not intended to be exhaustive or limit the invention to the precise form disclosed. Numerous modifications and alternative arrangements may be devised by those skilled in the art in light of the above teachings without departing from the spirit and scope of the present invention. It is intended that the scope of the invention be defined by the claims appended hereto.

In addition, the previously described versions of the present invention have many advantages, including but not limited to those described above. However, the invention does not require that all advantages and aspects be incorporated into every embodiment of the present invention.

All publications and patent documents cited in this application are incorporated by reference in their entirety for all purposes to the same extent as if each individual publication or patent document were so individually denoted.

What is claimed is:

1. A method of transmitting a continuous wave phase-modulated random radar signal and processing echo returns comprising:
   generating the continuous wave phase-modulated random radar signal by:
   generating a random subcode $\Theta_i$;
   producing a polyphase subcode $\phi_i$ corresponding to the random subcode $\Theta_i$ where the polyphase subcode $\phi_i$ is a member of a set of polyphase subcodes having N number of members;
   transmitting a modulated subcode $\Theta'_i$ from an antenna system during a subpulse width $\tau$ where $\tau$ is a measure of time, and where the modulated subcode $\Theta'_i$ is an electromagnetic signal having a phase over the subpulse width $\tau$, where the phase is based on the random subcode $\Theta_i$;
   generating a phase conversion parameter $(\phi_i-\Theta_i)$ using the random subcode $\Theta_i$ and the polyphase subcode $\phi_i$ and providing the phase conversion parameter $(\phi_i-\Theta_i)$ to a plurality of range gates comprising two or more range gates $RG_j$, where j is an integer unique to each range gate $RG_j$ and j is greater than or equal to 1, by providing the phase conversion parameter $(\phi_i-\Theta_i)$ to the each individual range gate $RG_j$ following a delay $D_j$ after transmission of the modulated subcode $\Theta'_i$ from the antenna system, where the delay $D_j$ is unique to the each individual range gate $RG_j$; and
   repeating the generating the random subcode $\Theta_i$ step, the producing the polyphase subcode $\phi_i$ step, the transmitting the modulated subcode $\Theta'_i$ step, and the generating the phase conversion parameter $(\phi_i-\Theta_i)$ using the random subcode $\Theta_i$ and the polyphase subcode $\phi_i$ and providing the phase conversion parameter $(\phi_i-\Theta_i)$ step, thereby transmitting the continuous wave phase-modulated random radar signal; and receiving an echo return of the continuous wave phase-modulated random radar signal and processing the echo return using the plurality of range gates $RG_j$, thereby processing echo returns.

2. The method of claim 1 where receiving the echo return of the continuous wave phase-modulated random radar signal and processing the echo return using the plurality of range gates $RG_j$ further comprises:
receiving the echo return from the antenna system;
demodulating the echo return and producing a demodulated subcode $\Theta_R$; and
providing the demodulated subcode $\Theta_R$ to the plurality of range gates $RG_j$.

3. The method of claim 2 further comprising processing the demodulated subcode $\Theta_R$ by, at the each range gate $RG_j$ by performing steps comprising:
receiving the demodulated subcode $\Theta_R$;
identifying a most recent phase conversion parameter $(\phi_k-\Theta_k)$ received from the corrections generator, where the most recent phase conversion parameter $(\phi_k-\Theta_k)$ is the phase conversion parameter $(\phi_i-\Theta_i)$ most recently provided to the each range gate $RG_j$;
generating an echo subcode $\phi_R$ by converting the demodulated subcode $\Theta_R$ using the most recent phase conversion parameter $(\phi_k-\Theta_k)$;
modifying a polyphase sequence comprising a string of subcodes by adding the echo subcode $\phi_R$ to the polyphase sequence, thereby generating an updated polyphase sequence; and
correlating the updated polyphase sequence using the set of polyphase subcodes having N number of members used by the polyphase subcode generator, thereby processing the demodulated subcode $\Theta_R$.

4. The method of claim 3 where the each range gate $RG_j$ has an associated $D_{RG(j)}$ where the associated $D_{RG(j)}$, is equal to $2\tau(j)+\Delta T_P$, where $\Delta T_P$ is a period $\Delta T_P$ based on an echo processing delay, and where $0.8 \leq D_j/D_{RG(j)} \leq 1.2$, where $D_j$ is the delay $D_j$ unique to the each range gate $RG_j$ and $D_{RG(j)}$ is the associated $D_{RG(j)}$ for the each range gate $RG_j$.

5. The method of claim 4 further comprising providing the demodulated subcode $\Theta_R$ to the plurality of range gates $RG_j$ over the period $\Delta T_P$.

6. The method of claim 5 where correlating the updated polyphase sequence using the set of polyphase subcodes having N number of members comprises correlating the updated polyphase sequence using a matched filter comprising a reference register, where the reference register comprises the set of polyphase subcodes having N number of members used by the polyphase subcode generator, thereby processing the demodulated subcode $\Theta_R$.

7. The method of claim 5 where generating the phase conversion parameter $(\phi_i-\Theta_i)$ using the random subcode $\Theta_i$ and the polyphase subcode $\phi_i$ comprises performing operations equivalent to $(\phi_i-\Theta_i)=f_1(\phi_i,\Theta_i)$ where $f_1$ is a mathematical function over at least some portion of a domain comprising $\phi_i$ and $\Theta_i$, and where $(\phi_i-\Theta_i)$ is the phase conversion parameter $(\phi_i-\Theta_i)$, $\phi_i$ is the polyphase subcode $\phi_i$, and $\Theta_i$ is the random subcode $\Theta_i$.

8. The method of claim 7 where generating the echo subcode $\phi_R$ by converting the demodulated subcode $\Theta_R$ using the most recent phase conversion parameter $(\phi_k-\Theta_k)$ comprises performing operations equivalent to $\phi_R=f_2((\phi_k-\Theta_k), \Theta_R)$, where $f_2$ is a mathematical function over at least some portion of a domain comprising $(\phi_k-\Theta_k)$ and $\Theta_R$ and where when $0.8 \leq \Theta_i/\Theta_R \leq 1.2$ and $0.8 \leq (\phi_i-\Theta_i)/(\phi_k-\Theta_k) \leq 1.2$, then $0.8 \leq \phi_i/\phi_R \leq 1.2$, where $\Theta_R$ is the demodulated subcode $\Theta_R$, $(\phi_k-\Theta_k)$ is the most recent phase conversion parameter $(\phi_k-\Theta_k)$, and $\phi_R$ is the echo subcode $\Theta_R$.

9. The method of claim 5 where the continuous wave phase-modulated random radar signal comprises a plurality of random subcodes $\Theta_i$ where the plurality of random subcodes $\Theta_i$ defines a plurality of phases over a time period T, and each phase comprising the plurality of phases satisfies a relationship $0.8 \leq p/x_{PDF} \leq 1.2$, where p is the each phase comprising the plurality of phases and $X_{PDF}$ is a point on a probability density function $(\mu,\sigma^2)$.

10. A system for transmitting a randomly modulated subcode and processing echo returns:
a transmitting system comprising:
a random waveform generator receiving a random noise signal and generating a random subcode $\Theta_i$, where the random subcode $\Theta_i$ has a subpulse width $\tau$ where $\tau$ is a measure of time;
a polyphase subcode generator producing a polyphase subcode $\phi_i$ corresponding to the random subcode $\Theta_i$ where the polyphase subcode $\phi_i$ is a member of a set of polyphase subcodes having N number of members;
an antenna system transmitting a modulated subcode $\Theta'_i$ at a time $t_i$, where the modulated subcode $\Theta'_i$ is an electromagnetic signal having a frequency and having a phase over the subpulse width $\tau$ dependent on the random subcode $\Theta_i$, thereby transmitting the randomly modulated subcode; and
a corrections generator performing steps comprising:
receiving the random subcode $\Theta_i$ from the random waveform generator;
receiving the polyphase subcode $\phi_i$ from the polyphase subcode generator; and
generating a phase conversion parameter $(\phi_i-\Theta_i)$ using the random subcode $\Theta_i$ and the polyphase subcode $\phi_i$ and providing the phase conversion parameter $(\phi_i-\Theta_i)$ to a plurality of range gates comprising two or more range gates $RG_j$, where j is an integer unique to each range gate $RG_j$ and j is greater than or equal to 1, by providing the phase conversion parameter $(\phi_i-\Theta_i)$ to the each range gate $RG_j$ following a delay $D_j$ after transmission of the modulated subcode $\Theta'_i$ from the antenna system, where the delay $D_j$ is unique to the each range gate $RG_j$;
the antenna system receiving an echo return of the modulated subcode $\Theta'_i$ transmitted by the antenna system;
a demodulator receiving the echo return and demodulating the echo return to produce a demodulated subcode $\Theta_R$, and providing the demodulated subcode $\Theta_R$ to the plurality of range gates;
the each range gate $RG_j$ receiving the demodulated subcode $\Theta_R$ and receiving the phase conversion parameter $(\phi_i-\Theta_i)$ following the delay $D_j$, and the each range gate $RG_j$ processing the demodulated subcode $\Theta_R$, thereby processing echo returns.

11. The system of claim 10 further comprising the demodulator receiving the echo return and demodulating the echo return to produce a demodulated subcode $\Theta_R$ and providing the demodulated subcode $\Theta_R$ to the plurality of range gates over a period $\Delta T_P$.

12. The system of claim 11 further comprising the corrections generator providing the phase conversion parameter $(\phi_i-\Theta_i)$ to the each range gate $RG_j$ using an associated $D_{RG(j)}$ for the each range gate $RG_j$, where the associated $D_{RG(j)}$ for the each range gate $RG_j$ is equal to $2\tau(j)+\Delta T_P$, and where $0.8 \leq D_j/D_{RG(j)} \leq 1.2$, where $D_j$ is the delay $D_j$ unique to the each range gate $RG_j$ and $D_{RG(j)}$ is the associated $D_{RG(j)}$ for the each range gate $RG_j$.

13. The system of claim 12 further comprising the each range gate $RG_j$ processing the demodulated subcode $\Theta_R$ by:
    generating an echo subcode $\phi_R$ by converting the demodulated subcode $\Theta_R$ using the phase conversion parameter $(\phi_i-\Theta_i)$ received from the corrections generator following the delay $D_j$;
    modifying a polyphase sequence comprising a string of subcodes by adding the echo subcode $\phi_R$ to the polyphase sequence, thereby generating an updated polyphase sequence; and
    correlating the updated polyphase sequence using the set of polyphase subcodes having N number of members used by the polyphase subcode generator, thereby processing the demodulated subcode $\Theta_R$.

14. The system of claim 13 further comprising:
    the corrections generator generating the phase conversion parameter $(\phi_i-\Theta_i)$ by performing operations equivalent to $(\phi_i-\Theta_i)=f_1(\phi_i, \Theta_i)$ where $f_1$ is a mathematical function over at least some portion of a domain comprising $\phi_i$ and $\Theta_i$, and where $(\Theta_i-\Theta_i)$ is the phase conversion parameter $(\phi_i-\Theta_i)$, $\phi_i$ is the polyphase subcode $\Theta_i$, and $\Theta_i$ is the random subcode $\Theta_i$;
    the each range gate $RG_j$ generating the echo subcode $\phi_R$ by performing operations equivalent to $\phi_R=f_2((\phi_k-\Theta_k), \Theta_R)$, where $f_2$ is a mathematical function over at least some portion of a domain comprising $(\phi_k-\Theta_k)$ and $\Theta_R$ and where when $0.8 \leq \Theta_i/\Theta_R \leq 1.2$ and $0.8 \leq (\phi_i-\Theta_i)/(\phi_k-\Theta_k) \leq 1.2$, then $0.8 \leq \phi_i/\phi_R \leq 1.2$, where $\Theta_R$ is the demodulated subcode $\Theta_R$, $(\phi_k-\Theta_k)$ is the most recent phase conversion parameter $(\phi_k-\Theta_k)$, and $\phi_R$ is the echo subcode $\phi_R$.

15. The system of claim 14 further comprising:
    the random waveform generator using a plurality of random noise signals and generating a plurality of random subcodes $\Theta_i$, where the plurality of random subcodes $\Theta_i$ defines a plurality of phases over a time period T, and where each phase comprising the plurality of phases satisfies a relationship $0.8 \leq p/x_{PDF} \leq 1.2$, where p is the each phase comprising the plurality of phases and $x_{PDF}$ is a point on a probability density function $(\mu, \sigma^2)$, and;
    the antenna system transmitting a plurality of modulated subcodes $\Theta'_i$, where every modulated subcode $\Theta'_i$ in the plurality of modulated subcodes $\Theta'_i$ is an electromagnetic signal having a frequency and having a phase over the subpulse width $\tau$ dependent on one of the random subcodes $\Theta_i$, comprising the plurality of random subcodes $\Theta_i$.

16. A Continuous Wave Radar Apparatus comprising:
    one or more digital processors programmed to generate a plurality of random subcodes, communicate a plurality of phase conversion parameters, and process echo returns by performing steps comprising:
    I) generating a random subcode $\Theta_i$;
    II) producing a polyphase subcode $\phi_i$ corresponding to the random subcode $\Theta_i$ where the polyphase subcode $\phi_i$ is a member of a set of polyphase subcodes having N number of members;
    III) generating a phase conversion parameter $(\phi_i-\Theta_i)$ using the random subcode $\Theta_i$ and the polyphase subcode $\phi_i$ and providing the phase conversion parameter $(\phi_i-\Theta_i)$ to a plurality of range gates comprising two or more range gates $RG_j$, where j is an integer unique to each range gate $RG_j$ and j is greater than or equal to 1, by providing the phase conversion parameter $(\phi_i-\Theta_i)$ to the each range gate $RG_j$ following a delay $D_j$ after a transmission time $t_i$, where the delay $D_j$ is unique to the each range gate $RG_j$;
    IV) generating a modulated subcode $\Theta'_i$ having a phase over a subpulse width $\tau$, where $\tau$ is a measure of time, and where the phase is based on the random subcode $\Theta_i$;
    V) communicating the modulated subcode $\Theta'_i$ to an antenna system;
    VI) receiving a time signal and using the time signal as the transmission time $t_i$;
    IV) repeating step I), step II), and step III), step IV), step V), and step VI), thereby generating the plurality of random subcodes and communicating the plurality of phase conversion parameters;
    IIV) producing and providing a demodulated subcode $\Theta_R$ by:
        IIV)A) receiving an echo return from the antenna system;
        IIV)B) demodulating the echo return and producing a demodulated subcode $\Theta_R$; and
        IIV)C) providing the demodulated subcode $\Theta_R$ to each range gate $RG_j$ comprising the plurality of range gates $RG_j$; and
    IIIV) processing the demodulated subcode $\Theta_R$ by directing the each range gate to perform steps comprising:
        IIIV)A) receiving the demodulated subcode $\Theta_R$;
        IIIV)B) identifying a most recent phase conversion parameter $(\phi_k-\Theta_k)$, where the most recent phase conversion parameter $(\phi_k-\Theta_k)$ is the phase conversion parameter $(\phi_i-\Theta_i)$ most recently provided to the each range gate $RG_j$;
        IIIV)C) generating an echo subcode $\phi_R$ by converting the demodulated subcode $\Theta_R$ using the most recent phase conversion parameter $(\phi_k-\Theta_k)$;
        IIIV)D) modifying a polyphase sequence comprising a string of subcodes by adding the echo subcode $\phi_R$ to the polyphase sequence, thereby generating an updated polyphase sequence; and
        IIIV)E) correlating the updated polyphase sequence using the set of polyphase subcodes having N number of members used by the polyphase subcode generator, thereby processing the demodulated subcode $\Theta_R$, thereby processing echo returns;
    the antenna system in data communication with the one or more digital processors and the antenna system configured to receive the modulated subcode $\Theta'_i$ and transmit the modulated subcode $\Theta'_i$, in response to a transmit signal, and the antenna system configured to provide the echo return to the one or more digital processors; and
    a timing circuit in data communication with the antenna system and the one or more digital processors and configured to provide the time signal to the one or more digital processors and the transmit signal to the antenna system.

17. The Continuous Wave Radar Apparatus of claim 16 where the one or more digital processors are further programmed to perform steps comprising:
    performing step IIV)A, step IIV)B), and step IIV)C over a period of time $\Delta T_P$; and
    providing the phase conversion parameter $(\phi_i-\Theta_i)$ to the each range gate $RG_j$ using an associated $D_{RG(j)}$, for the each range gate $RG_j$, where the associated $D_{RG(j)}$, for the each range gate $RG_j$ is equal to $2\tau(j)+\Delta T_P$ and where $0.8 \leq D_j/D_{RG(j)} \leq 1.2$, where $D_j$ is the delay $D_j$ unique to the each range gate $RG_j$, $D_{RG(j)}$, is the associated $D_{RG(j)}$, for the each range gate $RG_j$, and $\Delta T_P$ is the period of time $\Delta T_P$.

18. The Continuous Wave Radar Apparatus of claim 17 where the one or more digital processors are further programmed to direct the each range gate to correlate the updated polyphase sequence by using a matched filter comprising a reference register, where the reference register comprises the set of polyphase subcodes having N number of members used by the polyphase subcode generator.

19. The Continuous Wave Radar Apparatus of claim 18 where the one or more digital processors are further programmed to:

generate the phase conversion parameter $(\phi_i-\Theta_i)$ by performing operations equivalent to $(\phi_i-\Theta_i)=f_1(\phi_i,\Theta_i)$ where $f_1$ is a mathematical function over at least some portion of a domain comprising $\phi_i$ and $\Theta_i$, and where $(\phi_i-\Theta_i)$ is the phase conversion parameter $(\phi_i-\Theta_i)$, $\phi_i$ is the polyphase subcode $\phi_i$, and $\Theta_i$ is the random subcode $\Theta_i$; and direct the each range gate $RG_j$ to generate the echo subcode $\phi_R$ by performing operations equivalent to $\phi_R=f_2((\phi_k-\Theta_k), \Theta_R)$, where $f_2$ is a mathematical function over at least some portion of a domain comprising $(\phi_k-\Theta_k)$ and $\Theta_R$ and where when $0.8 \leq \Theta_i/\Theta_R \leq 1.2$ and $0.8 \leq (\phi_i-\Theta_i)/(\phi_k-\Theta_k) \leq 1.2$, then $0.8 \leq \phi_i/\phi_R \leq 1.2$, where $\Theta_R$ is the demodulated subcode $\Theta_R$, $(\phi_k-\Theta_k)$ is the most recent phase conversion parameter $(\phi_k-\Theta_k)$, and $\phi_R$ is the echo subcoded $\phi_R$.

20. The Continuous Wave Radar Apparatus of claim 19 further comprising a noise source in data communication with the one or more digital processors, and the one or more digital processors programmed to generate the random subcode $\Theta_i$ using the noise source.

* * * * *